US012496610B2

(12) United States Patent
Nishinaka et al.

(10) Patent No.: US 12,496,610 B2
(45) Date of Patent: Dec. 16, 2025

(54) ADHESIVE AGENT APPLYING APPARATUS AND ADHESIVE AGENT APPLICATION METHOD FOR LAMINATED IRON CORE AND MANUFACTURING APPARATUS AND MANUFACTURING METHOD FOR LAMINATED IRON CORE

(71) Applicant: Kuroda Precision Industries Ltd., Kawasaki (JP)

(72) Inventors: Koichi Nishinaka, Kawasaki (JP); Yusuke Fujino, Kawasaki (JP)

(73) Assignee: Kuroda Precision Industries Ltd., Kawasaki (JP)

( * ) Notice: Subject to any disclaimer, the term of this patent is extended or adjusted under 35 U.S.C. 154(b) by 6 days.

(21) Appl. No.: 18/262,775

(22) PCT Filed: Oct. 25, 2021

(86) PCT No.: PCT/JP2021/039330
§ 371 (c)(1),
(2) Date: Jul. 25, 2023

(87) PCT Pub. No.: WO2023/073770
PCT Pub. Date: May 4, 2023

(65) Prior Publication Data
US 2024/0424521 A1 Dec. 26, 2024

(51) Int. Cl.
*B05C 5/02* (2006.01)
*B05C 11/10* (2006.01)

(52) U.S. Cl.
CPC .......... *B05C 5/0225* (2013.01); *B05C 5/0275* (2013.01); *B05C 11/1002* (2013.01); *B05C 11/1044* (2013.01)

(58) Field of Classification Search
CPC ............................. H02K 15/00; H02K 15/027
See application file for complete search history.

(56) References Cited

U.S. PATENT DOCUMENTS 10,201,844 B2 2/2019 Nishinaka
2010/0043202 A1 2/2010 Tosu
(Continued)

FOREIGN PATENT DOCUMENTS

JP 2006-288114 A 10/2006
JP 2006-334648 * 10/2006
(Continued)

OTHER PUBLICATIONS

International Search Report for Application No. PCT/JP2021/039330, dated Jan. 11, 2022, 3 pages.

*Primary Examiner* — Austin Murata
(74) *Attorney, Agent, or Firm* — Dority & Manning, P.A.

(57) ABSTRACT

An adhesive agent applying apparatus includes an adhesive agent discharge head formed with multiple discharge ports configured to respectively discharge an adhesive agent toward multiple adhesive agent application points set in a part of a sheet steel strip corresponding to each iron core lamina; and an adhesive agent application control device configured to control discharge of the adhesive agent from the multiple discharge ports of the adhesive agent discharge head, wherein the multiple adhesive agent application points are arranged in same positions on each iron core lamina as seen in a stacking direction of each iron core lamina regardless of the type of each iron core lamina, and the adhesive agent application control device controls the discharge of the adhesive agent from the multiple discharge ports so as to change an application amount of the adhesive agent to at least some of the multiple adhesive agent application points depending on the type of each iron core lamina.

3 Claims, 16 Drawing Sheets

(56) References Cited

U.S. PATENT DOCUMENTS

| | | | | |
|---|---|---|---|---|
| 2017/0297078 | A1* | 10/2017 | Nishinaka | B05C 5/0212 |
| 2019/0259531 | A1* | 8/2019 | Okudaria | H02K 15/02 |
| 2022/0006336 | A1 | 1/2022 | Takeda et al. | |

FOREIGN PATENT DOCUMENTS

| | | | |
|---|---|---|---|
| JP | 2006-334648 | A | 12/2006 |
| JP | 2016-103978 | A | 6/2016 |

* cited by examiner

ADHESIVE AGENT APPLYING APPARATUS AND ADHESIVE AGENT APPLICATION METHOD FOR LAMINATED IRON CORE AND MANUFACTURING APPARATUS AND MANUFACTURING METHOD FOR LAMINATED IRON CORE

CROSS REFERENCE TO RELATED APPLICATIONS

This application is the U.S. National Stage entry of International Application No. PCT/JP2021/039330, filed on Oct. 25, 2023, which is incorporated herein by reference in its entirety for all purposes.

TECHNICAL FIELD

The present invention relates to an adhesive agent applying apparatus and an adhesive agent application method for a laminated iron core used as a motor core or the like and a manufacturing apparatus and a manufacturing method for a laminated iron core.

BACKGROUND ART

Conventionally, as a manufacturing apparatus for a laminated iron core, a progressive die is known, for example. In the progressive die, punching of pilot holes (positioning holes), slots, teeth, etc., which constitute an internal shape, is performed sequentially on a sheet steel strip (strip) made of an electromagnetic steel plate. Thereby, the shape of each iron core lamina for constituting the laminated iron core is formed sequentially in the sheet steel strip. Thereafter, the iron core laminae having the outer shape punched out from the sheet steel strip are secured together in a state in which a predetermined number of them are stacked.

Known methods for securing the iron core laminae include a lamination crimping method in which each iron core lamina is formed with irregularities for crimping and these iron core laminae are press fitted to each other in a stacked state (the irregularities of adjoining iron core laminae are crimped), a lamination welding method in which the multiple iron core laminae are joined by laser welding or the like after being stacked, and a lamination adhesive bonding method in which an adhesive agent is applied to the surface of the sheet steel strip so that at the same time as outer shape punching, the iron core lamina is stacked and adhered together. Particularly, the lamination adhesive bonding method has an advantage that deterioration of magnetic properties or the like at the joining parts of the iron core laminae is less likely to occur compared to the other methods.

As a manufacturing apparatus for a laminated iron core which uses the lamination adhesive bonding method, there is known an apparatus which manufactures a laminated iron core composed of multiple types of iron core laminae having external shapes different from each other by the lamination adhesive bonding method, for example (see Patent Document 1). In this manufacturing apparatus for a laminated iron core, when the type of the iron core lamina is changed during manufacture of one laminated iron core, supply of the adhesive agent to at least one of multiple adhesive agent storage rooms is suspended such that the adhesive agent is applied to the iron core lamina when the type is changed only in the regions overlapping with the iron core lamina immediately before the change of the type in the stacked state.

PRIOR ART DOCUMENT(S)

Patent Document(s)

Patent Document 1: JP6445042B2

SUMMARY OF THE INVENTION

Task to Be Accomplished by the Invention

Incidentally, in a laminated iron core composed of multiple types of iron core laminae having shapes different from each other (at least one of the external shape and the internal shape), the stress distribution in the laminated iron core changes depending on the shapes of the iron core laminae when some external force acts during use of the laminated iron core or after the laminated iron core is discharged from the squeeze ring.

As a result of extensive research, the inventors of the present application found that in such a laminated iron core composed of multiple types of iron core laminae, in a case where the adhesive agent is applied to each iron core lamina evenly (namely, in the same application amount), parts where the application amount of the adhesive agent (namely, the bonding strength between the iron core laminae) becomes insufficient and/or parts where the application amount of the adhesive agent become excessive can occur due to effect of external force.

In such a laminated iron core, if the adhesive agent applied to each iron core lamina is insufficient, the possibility that troubles such as separation or fracture of an iron core lamina may occur due to effect of external force increases, and if the adhesive agent is excessive, the manufacturing cost of the laminated iron core increases.

In the conventional technology described in the aforementioned Patent Document 1, when the type of the iron core lamina is changed during manufacture of one laminated iron core, the flow rate of the adhesive agent discharged from the adhesive agent applying apparatus is adjusted such that the adhesive agent is applied only in the regions overlapping with the iron core lamina immediately before the change of the type in the stacked state (namely, application of the adhesive agent to the regions in which the adjoining iron core lamina do not overlap with each other is avoided). However, Patent Document 1 fails to disclose details of a configuration and method for changing the application amount of the adhesive agent depending on the type of the iron core lamina in the manufacture of the laminated iron core.

The present invention has been made in view of such prior art problems, and a main object of the present invention is to provide an adhesive agent applying apparatus and an adhesive agent application method for a laminated iron core as well as a manufacturing apparatus and a manufacturing method for a laminated iron core which, in the manufacture of a laminated iron core composed of multiple types of iron core laminae having shapes different from each other, can change the application amount of an adhesive agent depending on the type of each iron core lamina with a simple configuration.

Means to Accomplish the Task

In a first aspect of the present invention, there is provided an adhesive agent applying apparatus for a laminated iron core, wherein the laminated iron core comprises multiple types of iron core laminae having shapes different from each other and each punched out from a sheet steel strip, the adhesive agent applying apparatus comprising: an adhesive agent discharge head formed with multiple discharge ports configured to respectively discharge an adhesive agent toward multiple adhesive agent application points set in a part of the sheet steel strip corresponding to each iron core lamina, and an adhesive agent application control device configured to control discharge of the adhesive agent from the multiple discharge ports of the adhesive agent discharge head, wherein the multiple adhesive agent application points are arranged in same positions on each iron core lamina as seen in a stacking direction of each iron core lamina regardless of the type of each iron core lamina, and the adhesive agent application control device controls the discharge of the adhesive agent from the multiple discharge ports so as to change an application amount of the adhesive agent to at least some of the multiple adhesive agent application points depending on the type of each iron core lamina.

According to this, in the manufacture of a laminated iron core composed of multiple types of iron core laminae having shapes different from each other, it is possible, with a simple configuration, to change the application amount of the adhesive agent depending on the type of each iron core lamina.

In a second aspect of the present invention, the adhesive agent application control device sequentially acquires punching signals synchronized with punching of respective iron core laminae from the sheet steel strip, and controls the discharge of the adhesive agent from the multiple discharge ports based on a number of the acquired punching signals.

According to this, based on the punching signals synchronized with punching of the respective iron core laminae, it is possible to more reliably change the application amount of the adhesive agent depending on the type of each iron core lamina.

In a third aspect of the present invention, the adhesive agent applying apparatus further comprises an adhesive agent supplying apparatus configured to continuously supply the adhesive agent to the adhesive agent discharge head, wherein the adhesive agent application control device controls the discharge of the adhesive agent from the multiple discharge ports by changing a supply amount of the adhesive agent from the adhesive agent supplying apparatus per unit time.

According to this, it is possible to change the application amount of the adhesive agent depending on the type of each iron core lamina while stably supplying the adhesive agent to the adhesive agent discharge head.

In a fourth aspect of the present invention, adhesive agent applying apparatus further comprises an adhesive agent supplying apparatus configured to intermittently supply the adhesive agent to the adhesive agent discharge head.

According to this, it is possible to easily change the application amount of the adhesive agent depending on the type of each iron core lamina.

In a fifth aspect of the present invention, the adhesive agent supplying apparatus comprises an adhesive agent transfer pump, and when the type of the iron core lamina to which the adhesive agent is to be applied changes, the adhesive agent application control device changes a rotation speed of the adhesive agent transfer pump based on the punching signal corresponding to another iron core lamina punched out before the punching signal corresponding to the iron core lamina to which the adhesive agent is to be applied.

According to this, even in a case where there is a time lag from when the supply amount of the adhesive agent from the adhesive agent transfer pump (namely, the rotation speed of the adhesive agent transfer pump) changes to when the application amount of the adhesive agent to the iron core lamina changes, it is possible to more reliably change the application amount of the adhesive agent depending on the type of each iron core lamina.

In a sixth aspect of the present invention, the adhesive agent supplying apparatus comprises an adhesive agent transfer pump, and when the type of the iron core lamina to which the adhesive agent is to be applied changes, the adhesive agent application control device changes a discharge pressure of the adhesive agent transfer pump based on the punching signal corresponding to another iron core lamina punched out before the punching signal corresponding to the iron core lamina to which the adhesive agent is to be applied.

According to this, even in a case where there is a time lag from when the supply amount of the adhesive agent from the adhesive agent transfer pump (namely, the discharge pressure of the adhesive agent transfer pump) changes to when the application amount of the adhesive agent to the iron core lamina changes, it is possible to more reliably change the application amount of the adhesive agent depending on the type of each iron core lamina.

In a seventh aspect of the present invention, the multiple types of iron core laminae include first iron core laminae and second iron core laminae having an outer diameter smaller than an outer diameter of the first iron core laminae, and the adhesive agent application control device controls the discharge of the adhesive agent from the multiple discharge ports such that the application amount of the adhesive agent to at least some of the multiple adhesive agent application points becomes greater for the second iron core laminae than for the first iron core laminae.

According to this, it is possible, in the laminated iron core, to enhance the bonding strength between the second iron core laminae which have a smaller outer shape, and therefore, when external force acts on the laminated iron core, troubles such as separation or fracture can be prevented from occurring in the part configured by the second iron core laminae. Also, in a case where the application amount of the adhesive agent to each adhesive agent application point in the first iron core laminae is set to be the same as in the second iron core lamina, it is possible to avoid excess of the adhesive agent on the first iron core laminae (increase in the manufacturing cost of the laminated iron core).

In an eighth aspect of the present invention, the first iron core laminae and the second iron core laminae each have a substantially circular external shape, and at least some of the multiple adhesive agent application points are arranged in a circle at predetermined intervals in a circumferential direction along an outer peripheral edge of each of the first iron core laminae and the second iron core laminae.

According to this, the bonding strength between the second iron core laminae can be enhanced more reliably, and therefore, when external force acts on the laminated iron core, troubles such as separation or fracture can be more reliably prevented from occurring in the part configured by the second iron core laminae.

In a ninth aspect of the present invention, the laminated iron core includes multiple iron core lamina blocks each composed of multiple iron core laminae having an identical shape, and the adhesive agent application control device controls discharge of the adhesive agent from the adhesive agent discharge head for each iron core lamina block.

According to this, it is possible, with a simple configuration, to change the application amount of the adhesive agent depending on the type of the iron core laminae constituting each iron core lamina block.

In a tenth aspect of the present invention, the multiple types of iron core laminae include third iron core laminae formed with openings or notches and fourth iron core laminae which do not have a shape corresponding to the openings and the notches, and the adhesive agent application control device controls the discharge of the adhesive agent from the multiple discharge ports such that the application amount of the adhesive agent to at least some of the multiple adhesive agent application points adjacent to the openings or the notches becomes greater for the fourth iron core laminae than for the third iron core laminae.

According to this, in the laminated iron core, even when it is difficult to apply the adhesive agent to the part of the third iron core lamina where the opening or the notch is formed, the application amount of the adhesive agent to the fourth iron core lamina is enhanced, whereby it is possible to suppress insufficiency of the adhesive agent (namely, the bonding strength) in the laminated iron core as much as possible.

In an eleventh aspect of the present invention, there is provided an adhesive agent application method for a laminated iron core, wherein the laminated iron core comprises multiple types of iron core laminae having shapes different from each other and each punched out from a sheet steel strip, the method comprises an adhesive agent applying step in which an adhesive agent is discharged from multiple discharge ports respectively toward multiple adhesive agent application points set in a part of the sheet steel strip corresponding to each iron core lamina, the multiple adhesive agent application points are arranged in same positions on each iron core lamina as seen in a stacking direction of each iron core lamina regardless of the type of each iron core lamina, and in the adhesive agent applying step, discharge of the adhesive agent from the multiple discharge ports is controlled so as to change an application amount of the adhesive agent to at least some of the multiple adhesive agent application points depending on the type of each iron core lamina.

In a twelfth aspect of the present invention, a manufacturing apparatus for a laminated iron core comprises: the adhesive agent applying apparatus for a laminated iron core according to any one of the aforementioned first to eighth aspects; and a punching device configured to sequentially punch the multiple types of iron core laminae out from the sheet steel strip.

In a thirteenth aspect of the present invention, there is provided a manufacturing method for a laminated iron core, wherein the laminated iron core comprises multiple types of iron core laminae having shapes different from each other and each punched out from a sheet steel strip, the method comprising: a punching step in which the multiple types of iron core laminae are sequentially punched out from the sheet steel strip which is intermittently conveyed; and an adhesive agent applying step in which an adhesive agent is discharged from multiple discharge ports respectively toward multiple adhesive agent application points set in a part of the sheet steel strip corresponding to each iron core lamina, wherein the multiple adhesive agent application points are arranged in same positions on each iron core lamina as seen in a stacking direction of each iron core lamina regardless of the type of each iron core lamina, and in the adhesive agent applying step, discharge of the adhesive agent from the multiple discharge ports is controlled so as to change an application amount of the adhesive agent to at least some of the multiple adhesive agent application points depending on the type of each iron core lamina.

According to the aforementioned eleventh to thirteenth aspects of the present invention, in the manufacture of a laminated iron core composed of multiple types of iron core laminae having shapes different from each other, it is possible, with a simple configuration, to change the application amount of the adhesive agent depending on the type of each iron core lamina.

In a fourteenth aspect of the present invention, the manufacturing method further comprises a press working oil applying step in which press working oil is applied on one side or both sides of the sheet steel strip prior to the punching step, wherein the press working oil contains a curing accelerator of the adhesive agent.

According to this, by applying the press working oil on the sheet steel strip, the adhesive bonding between the iron core laminae is achieved quickly and firmly.

Effect of the Invention

Thus, according to the present invention, in the manufacture of a laminated iron core composed of multiple types of iron core laminae having shapes different from each other, it is possible to change the application amount of an adhesive agent depending on the type of each iron core lamina with a simple configuration.

MODE(S) FOR CARRYING OUT THE INVENTION

Figure 1:
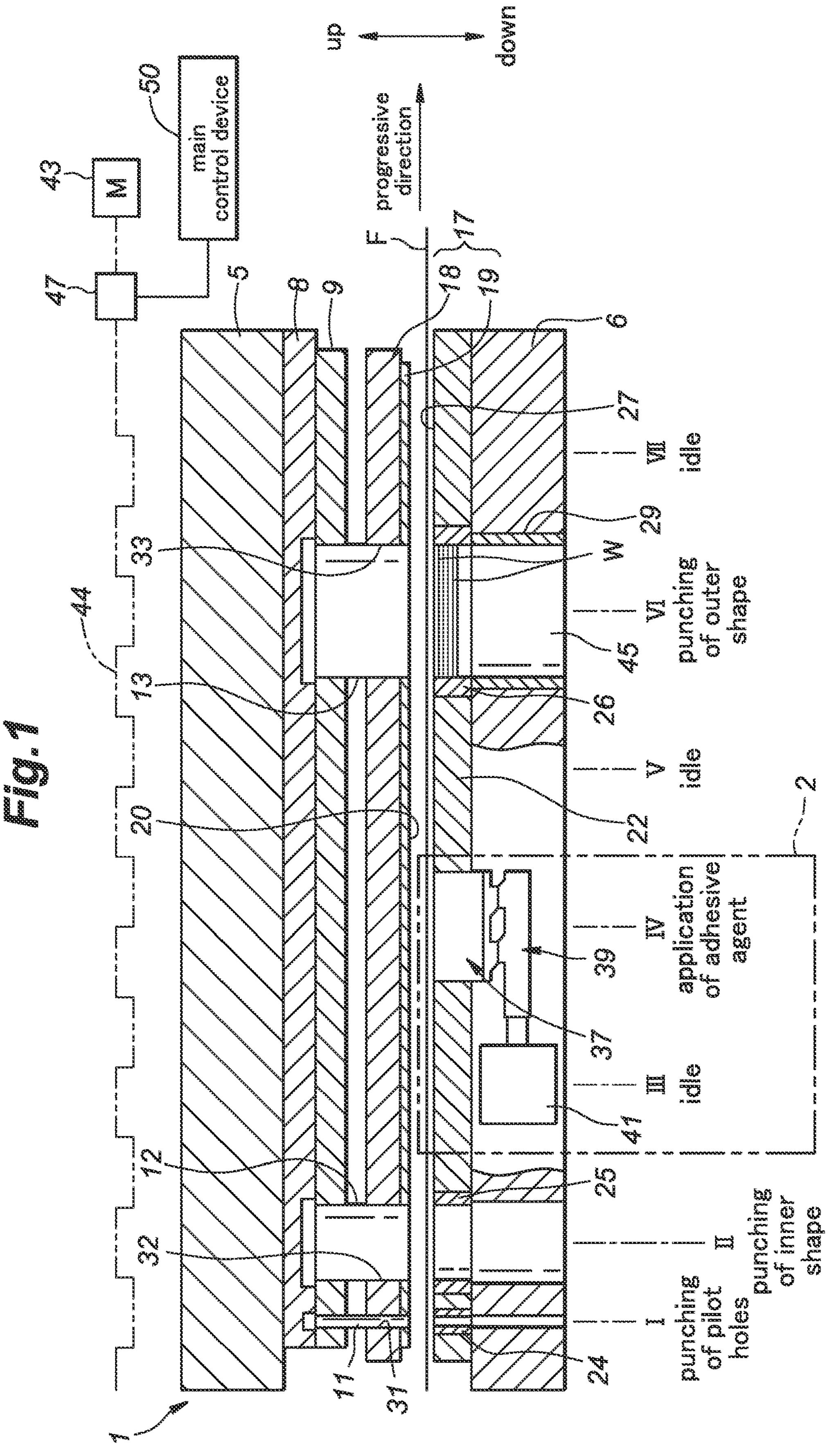
FIG. 1 is a schematic configuration diagram showing a manufacturing apparatus for a laminated iron core according to a first embodiment.

In the following, embodiments of the present invention will be described with reference to the drawings. For convenience of explanation, directions are defined as indicated by arrows in the drawings (see FIGS. 1 and 5). Note, however, that actual arrangement of a laminated iron core manufacturing apparatus 1 is not limited by these directions.

FIG. 1 is a schematic configuration diagram showing a laminated iron core manufacturing apparatus 1 according to a first embodiment of the present invention.

As shown in FIG. 1, the laminated iron core manufacturing apparatus 1 is configured by a progressive die provided with an adhesive agent applying apparatus 2 for a laminated iron core. A laminated iron core C manufactured by this laminated iron core manufacturing apparatus 1 includes multiple types of iron core laminae (see first and second iron core laminae W1, W2 shown in FIGS. 2 to 4) having shapes different from each other (at least one of the external shape and the internal shape) and each punched out from a strip F. In the following, the multiple types of iron core laminae W1, W2, etc. may be collectively referred to as the iron core laminae W when it is not necessary to distinguish them from each other.

The laminated iron core manufacturing apparatus 1 is provided with a pilot hole punching station I, an inner shape punching station II, an idle station III, an adhesive agent applying station IV, an idle station V, an outer shape punching station VI, and an idle station VII in order in a progressive direction (see the arrow in FIG. 1) of the strip F (sheet steel strip). The strip F is made of an electromagnetic steel plate. In the laminated iron core manufacturing apparatus 1, the stations I, II, and VI execute respective punching steps on the strip F which is intermittently conveyed, and the station IV executes an adhesive agent applying step.

The laminated iron core manufacturing apparatus 1 includes a plate-shaped upper holder 5 which is fixed to an upper ram (not shown in the drawings) of a press machine and a plate-shaped lower holder 6 which is fixed to a lower table (not shown in the drawings) of the press machine so as to oppose the upper holder 5.

Punches 11 for pilot hole punching, a punch 12 for inner shape punching, and a punch 13 for outer shape punching are attached to the lower side of the upper holder 5 at positions corresponding to the stations I, II, and VI by a back plate 8 and a punch plate 9. The upper holder 5, the back plate 8, and the punch plate 9 constitute an upper die of the laminated iron core manufacturing apparatus 1, and can move in a reciprocating manner in accordance with the operation of the press machine. Note, however, that the constituent parts of the upper die of the laminated iron core manufacturing apparatus 1 are not limited to them, and they may be changed to other known constituent parts.

A stripper 17 is mounted below the upper holder 5. The stripper 17 is provided to be displaceable in the up-down direction relative to the upper holder 5. The stripper 17 is supported in a hanging manner by hanging bolts (not shown in the drawings), whereby the lowest position relative to the upper holder 5 is set.

The stripper 17 includes a plate-shaped stripper main body 18 and a stripper plate 19 fixed to the lower portion of the stripper main body 18. A lower surface 20 of the stripper plate 19 opposes an upper surface of a die plate 22, dies 24 for pilot hole punching, a die 25 for inner shape punching, and a die 26 for outer shape punching, which will be described later. The upper surfaces of the die plate 22 and the dies 24, 25, and 26 constitute a single flat surface with no steps, and therefore, these upper surfaces are collectively referred to as the upper surface 27 of the die plate 22 in the following description. The stripper plate 19 is formed with punch passing holes 31, 32, 33 through which the punches 11, 12, 13 pass. The punches 11, 12, 13 are each provided to be displaceable in the up-down direction relative to the stripper plate 19.

The die plate 22 is attached to the upper surface of the lower holder 6. The dies 24, 25, and 26 are attached to the die plate 22 at positions corresponding to the punching stations I, II, and VI. When punching the strip F, the dies 24, 25, and 26 cooperate with the corresponding punches 11, 12, 13. The lower holder 6 is provided with a squeeze ring 29 positioned below the die 26 for outer shape punching. The lower holder 6, the die plate 22, and the dies 24, 25, and 26 constitute a lower die that forms a pair with the upper die in the laminated iron core manufacturing apparatus 1. Note, however, that the constituent parts of the lower die of the laminated iron core manufacturing apparatus 1 are not limited to them, and they may be changed to other known constituent parts.

The adhesive agent applying apparatus 2 is provided in the lower die at the adhesive agent applying station IV of the laminated iron core manufacturing apparatus 1. The adhesive agent applying apparatus 2 includes an application table 37 that discharges the adhesive agent toward the strip F, a cam mechanism 39 for moving the application table 37 up and down, and a driving apparatus 41 that drives the cam mechanism 39. In the present embodiment, the adhesive agent applying apparatus 2 is integrally incorporated in a punching device (here, a progressive press die) which can sequentially punch the iron core laminae W constituting the laminated iron core C from a work material such as the strip F. Note, however, that the adhesive agent applying apparatus 2 may be provided as a separate device which can cooperate with the punching device.

In the laminated iron core manufacturing apparatus 1, rotational motion of a crankshaft 44 of the press machine driven by the upper die driving motor 43 is converted into reciprocating motion of the upper holder 5 (the upper ram of the press machine) in the up-down direction via a connecting rod (not shown in the drawings). The laminated iron core manufacturing apparatus 1 is provided with an encoder 47 that detects the rotation phase of the crankshaft 44 (the rotation angle of the crankshaft 44 from a reference rotation position) and generates an encoder signal indicating the detection result.

The operation of the laminated iron core manufacturing apparatus 1 is controlled by a main control device 50. Though details are not shown in the drawings, the main control device 50 includes known hardware such as one or more processors, a driver for the upper die driving motor 43, a display device (such as a liquid crystal monitor), an input device (such as a touch panel), a storage, a memory (RAM, ROM, etc.), and so on. According to a prescribed control program, the processor can totally control the punching operation (see FIG. 9) performed by the laminated iron core manufacturing apparatus 1. As will be described in detail later, the main control device 50 can generate an operation signal, a punching signal, a stacking number reset signal, etc. based on the encoder signal and can send them out to the adhesive agent applying apparatus 2 as appropriate.

In the pilot hole punching station I, pilot holes (not shown in the drawings) are punched in the strip F by the punches 11 for pilot hole punching and the dies 24 for pilot hole punching for each press operation of the press machine, in other words, for each intermittent conveyance of the strip F. The pilot holes are formed near the edge portions on both left and right sides with respect to the progressive direction of the strip F, for example.

In the inner shape punching station II, an inner shape IS (see FIGS. 3 and 4) is punched in the strip F by the punch 12 for inner shape punching and the die 25 for inner shape punching for each intermittent conveyance of the strip F. The inner shape IS punched by the inner shape punching station II forms an internal shape of the iron core lamina W. In the inner shape punching station II, later-described openings 95, 195 (see FIGS. 11 and 12) and notches (not shown in the drawings) may be formed as the internal shape of the iron core lamina W.

In the adhesive agent applying station IV, the adhesive agent is applied by the adhesive agent applying apparatus 2 in dots to multiple adhesive agent application points (see application points E1, E2 shown in FIGS. 3 and 4) set in a part of the strip F corresponding to the iron core lamina (namely, a region to be punched out later in the outer shape punching station VI). In the following, the multiple application points E1, E2 may be collectively referred to as application points E when it is not necessary to distinguish between them.

In the present embodiment, the multiple application points E are set on the lower surface of the strip F, which is an adhesive agent applying surface. Note, however, that the adhesive agent applying surface of the strip F may be an upper surface. The adhesive agent applying apparatus 2 applies (transfers) the adhesive agent in dots to multiple locations (application points E) on the lower surface of the strip F for each press operation (reciprocating movement of the upper die) when the application table 37 is in a raised position. For the part corresponding to the iron core lamina W located at the lowest layer of the laminated iron core C (a so-called measuring iron core lamina), the application table 37 descends to the descent position, whereby the application of the adhesive agent to the strip F is paused. Note that a known curing accelerator for promoting curing of the adhesive agent may be applied to the upper surface of the strip F. Such a curing accelerator is preferably applied together with the press working oil at the time of introduction (or prior to introduction) of the strip F into the laminated iron core manufacturing apparatus 1, for example. Also, the curing accelerator for the adhesive agent may be added to the press working oil.

In the outer shape punching station VI, an outer shape OS (see FIG. 3 and FIG. 4) of the iron core lamina W is punched out from the strip F by the punch 13 for outer shape punching and the die 26 for outer shape punching. This outer shape punching provides a completed iron core lamina W. The iron core lamina W that has been punched out is laid over the iron core laminae W in the die 26 for outer shape punching which have been punched out earlier. Each iron core lamina W moves downward in the die 26 for outer shape punching and is stacked sequentially. Thereafter, each iron core lamina W is sequentially pushed into the squeeze ring 29 located below the die 26 for outer shape punching. In the squeeze ring 29, the vertically overlapping iron core laminae W except for the measuring iron core lamina which is not applied the adhesive agent are bonded to each other by the adhesive agent. At this time, the adhesive agent in dots expands to the surrounding of each application point E (namely, in a direction perpendicular to the stacking direction of the iron core laminae W) between the adjoining iron core laminae W. Note that in the outer shape punching station VI, each iron core lamina W may be rotationally stacked in the die 26 for outer shape punching (stacked in a state rotated by a predetermined angle).

The stack of the iron core laminae W united by the adhesive agent is discharged downward from an outlet hole 45 formed in the lower holder 6 (squeeze ring 29) at the outer shape punching station VI, and thereafter, is subjected to post-processing for thermosetting the adhesive agent as necessary.

Figure 2:
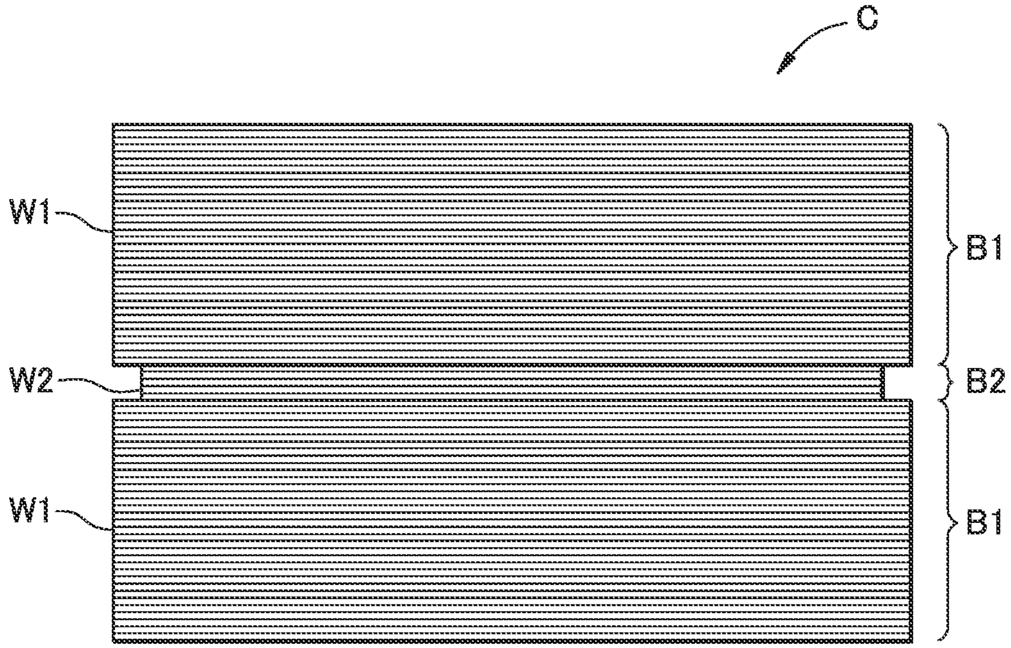
FIG. 2 is a side view showing one example of a laminated iron core manufactured by the manufacturing apparatus shown in FIG. 1.
Figure 3:
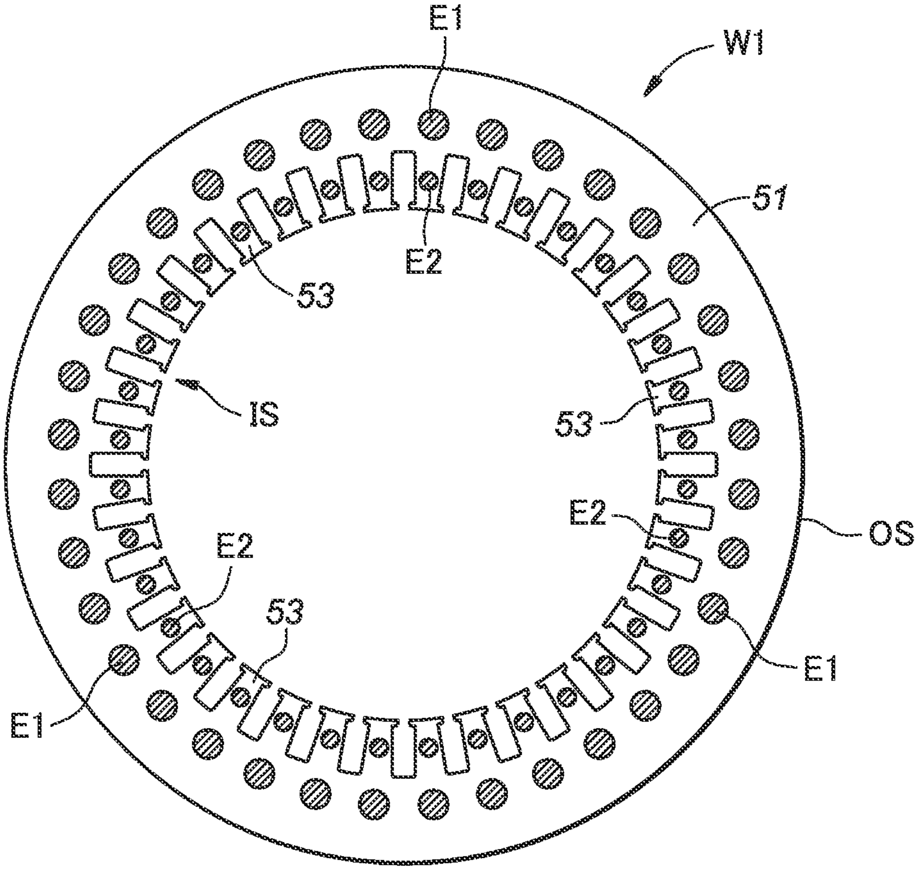
FIG. 3 is a plan view of a first iron core lamina constituting the laminated iron core shown in FIG. 2.
Figure 4:
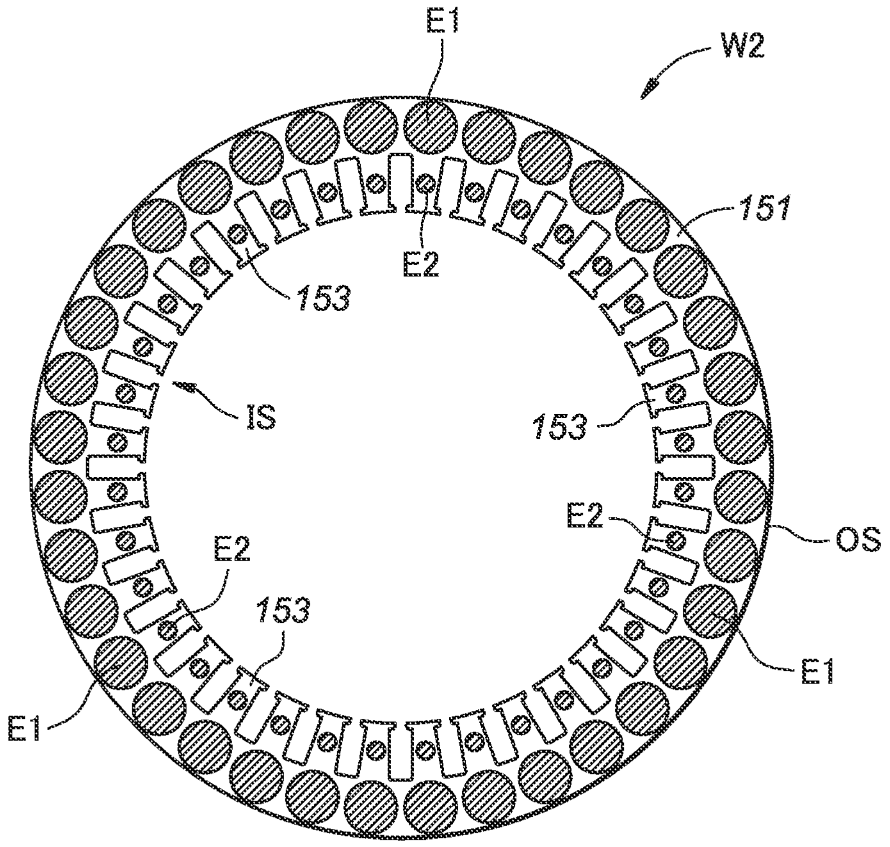
FIG. 4 is a plan view of a second iron core lamina constituting the laminated iron core shown in FIG. 2.

FIG. 2 is a side view showing one example of the laminated iron core C manufactured by the laminated iron core manufacturing apparatus 1 shown in FIG. 1. FIGS. 3 and 4 are plan views of a first iron core lamina W1 and a second iron core lamina W2, respectively, which constitute the laminated iron core C shown in FIG. 2.

As shown in FIG. 2, the laminated iron core C includes a first iron core lamina block B1 composed of only the first iron core laminae W1 and a second iron core lamina block B2 composed of only the second iron core laminae W2. Each iron core lamina block B1, B2 is composed of multiple iron core laminae having an identical shape. The second iron core lamina block B2 has an outer diameter smaller than that of the first iron core lamina block B1.

In the present embodiment, the laminated iron core C has a configuration in which the second iron core lamina block B2 disposed at the center in the up-down direction is vertically sandwiched by two first iron core lamina blocks B1 in the up-down direction. As a result, the laminated iron core C has a shape with a central part in the up-down direction constricted as seen in the side view. In the laminated iron core C with such a constricted part (small diameter part), the application amount of the adhesive agent at the constricted part (namely, the bonding strength between the iron core laminae W2) tends to be insufficient against the effect of external force, and therefore, it is preferred to increase the application amount of the adhesive agent than for the first iron core laminae W1.

As shown in FIG. 3, the first iron core lamina W1 includes a circular, annular yoke portion 51 having a substantially circular outer shape OS (outer peripheral edge) formed by outer shape punching. The first iron core lamina W1 has multiple tooth portions 53 (magnetic pole portions) protruding radially inward from the yoke portion 51 as the inner shape IS formed by inner shape punching.

On the adhesive agent applying surface (here, the lower surface) of the first iron core lamina W1, multiple application points E1 arranged substantially in a circle (namely, along an imaginary circle not shown in the drawings) at predetermined intervals in the circumferential direction along the outer peripheral edge are set on the yoke portion 51. Also, one application point E2 is set on each tooth portion 53. The size of each application point E1, E2 in FIG. 3 indicates the size of the application region (here, corresponding to the application amount) of the adhesive agent (same with FIG. 4). Here, the application region of each application point E1 is larger than the application region of each application point E2. Also, each application point E1 is disposed on a radially outer side of the corresponding one of the application points E2. Thus, the number of the multiple application points E1 is the same as the number of the multiple application points E2. Note that the application points E1 and E2 do not have to be the same in number.

As shown in FIG. 4, the second iron core lamina W2 has a circular, annular yoke portion 151 having an outer shape OS (outer peripheral edge) formed by outer shape punching. The second iron core lamina W2 has multiple tooth portions 153 protruding radially inward from the yoke portion 151 as with the first iron core lamina W1 (the tooth portions 53). The radial width of the yoke portion 151 is smaller than that of the yoke portion 51 of the first iron core lamina W1.

In the second iron core lamina W2, application points E1 are set on the yoke portion 151 at the same positions as the application points E1 of the first iron core lamina W1 as seen in the stacking direction. However, the application region (namely, the application amount) of each application point E1 on the second iron core lamina W2 is larger than the application region of each application point E1 on the first iron core lamina W1 (see FIG. 3). Thereby, in the laminated iron core C, the bonding strength between the second iron core laminae W2 which have a smaller outer shape can be enhanced, whereby when external force acts on the laminated iron core C, troubles such as separation or fracture can be prevented from occurring in the part configured by the second iron core laminae W2. Particularly, since the application points E1 for which the application amount is increased are arranged along the outer peripheral edge of each second iron core lamina W2, the bonding strength between the second iron core laminae W2 can be enhanced more reliably.

Also, in the second iron core lamina W2, one application point E2 is set on each tooth portion 53. The application region of each application point E2 on the second iron core lamina W2 is set to be identical with that of the application point E2 on the first iron core lamina W1 located at the same position as seen in the stacking direction.

Note that since the second iron core lamina W2 has an outer diameter smaller than that of the first iron core lamina W1, in the above-described outer shape punching station VI (see FIG. 1), the outer diameter thereof is smaller than the inner diameter of the die 26 for outer shape punching and the squeeze ring 29 which is set in accordance with the outer diameter of the first iron core lamina W1. Consequently, there is a possibility that the second iron core lamina W2 is not stably held in the die 26 for outer shape punching and the squeeze ring 29. Therefore, for example, the second iron core lamina W2 may be preferably provided with multiple protrusions (not shown in the drawings) extending outward from the outer peripheral edge (outer shape OS) thereof and arranged in the circumferential direction at predetermined intervals, so that the substantive outer diameter (namely, the outer diameter based on the position of the tip of each protrusion) of the second iron core lamina W2 is substantially the same as the outer diameter of the first iron core lamina W1. The punching station for forming the protrusions of the second iron core lamina W2 may be provided between the pilot hole punching station I and the adhesive agent applying station IV.

Figure 5:
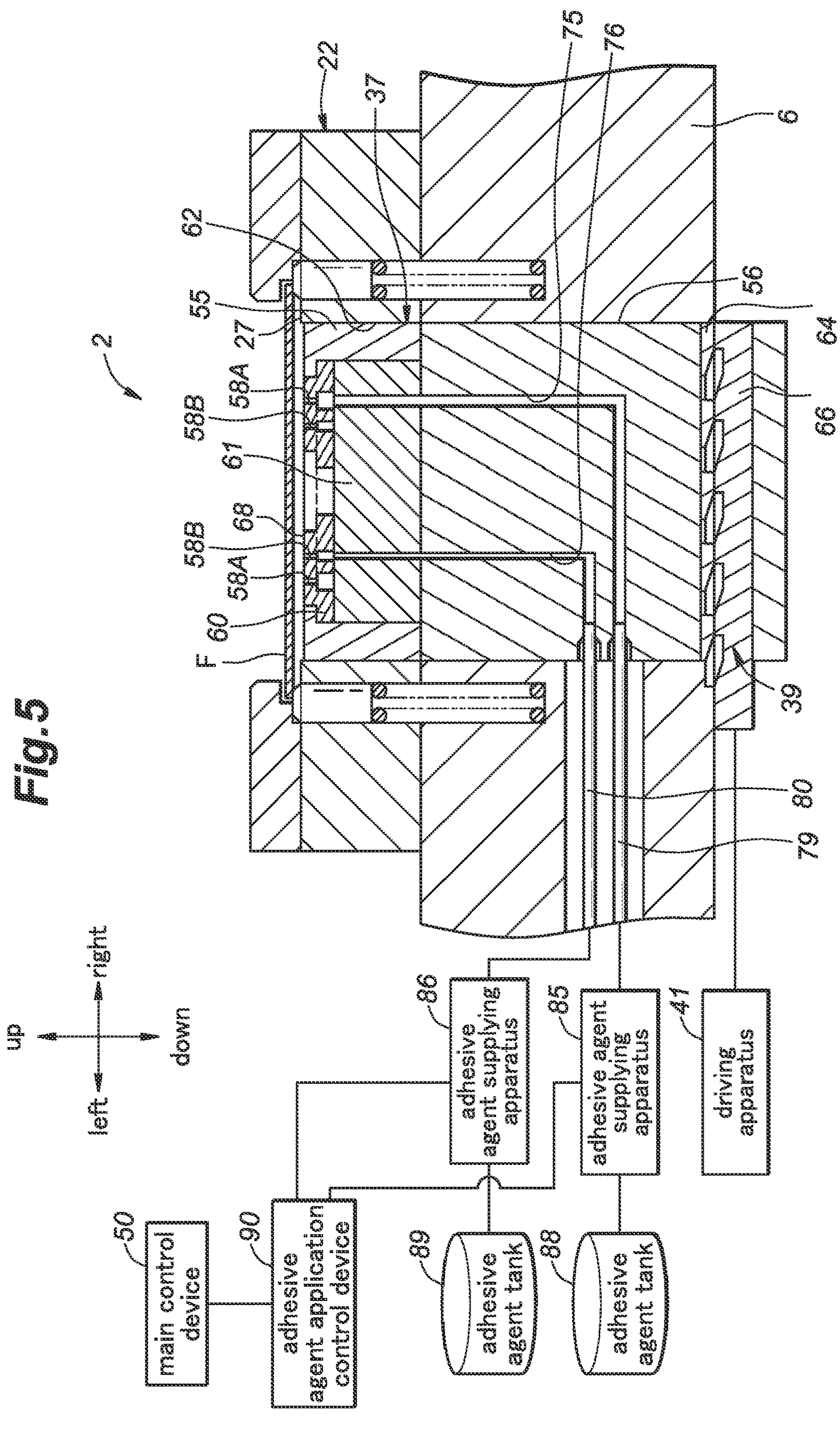
FIG. 5 is an explanatory diagram showing a detailed configuration of an adhesive agent applying apparatus according to the first embodiment.
Figure 6:
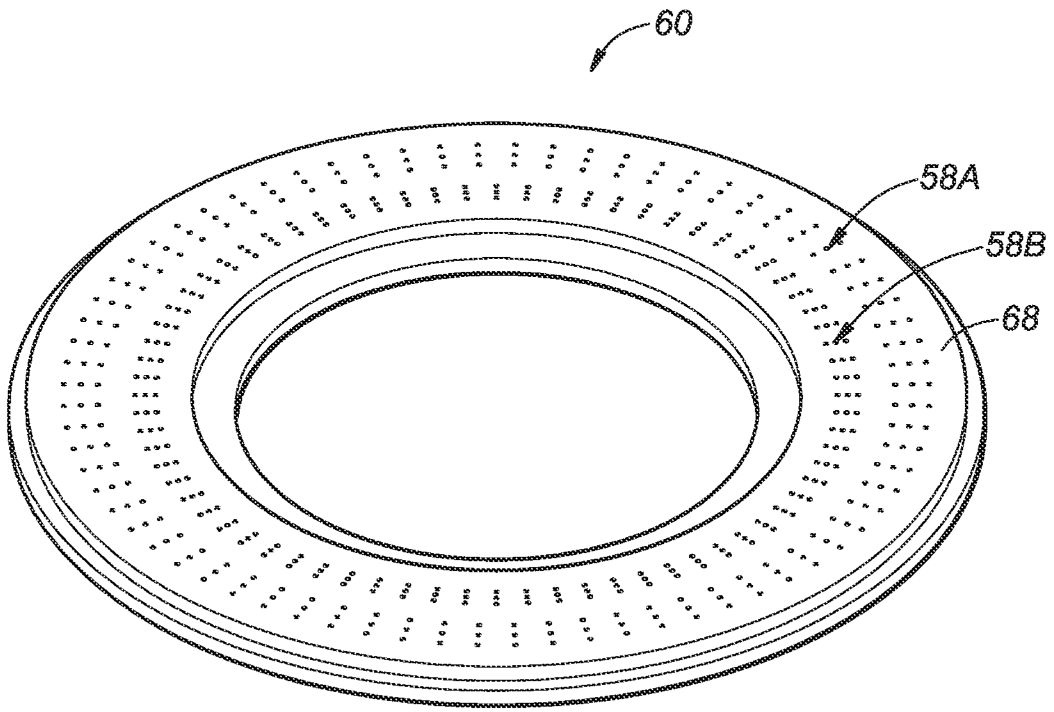
FIG. 6 is a perspective view of an upper side of a nozzle block of the adhesive agent applying apparatus.
Figure 7:
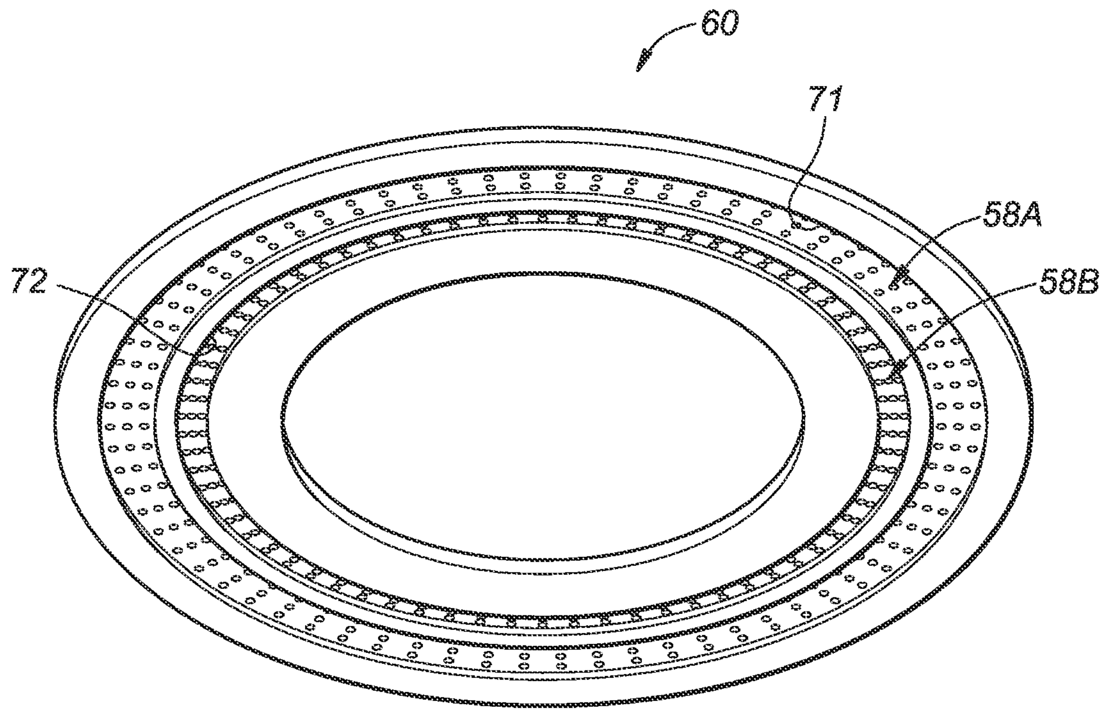
FIG. 7 is a perspective view of a lower side of the nozzle block of the adhesive agent applying apparatus.
Figure 8:
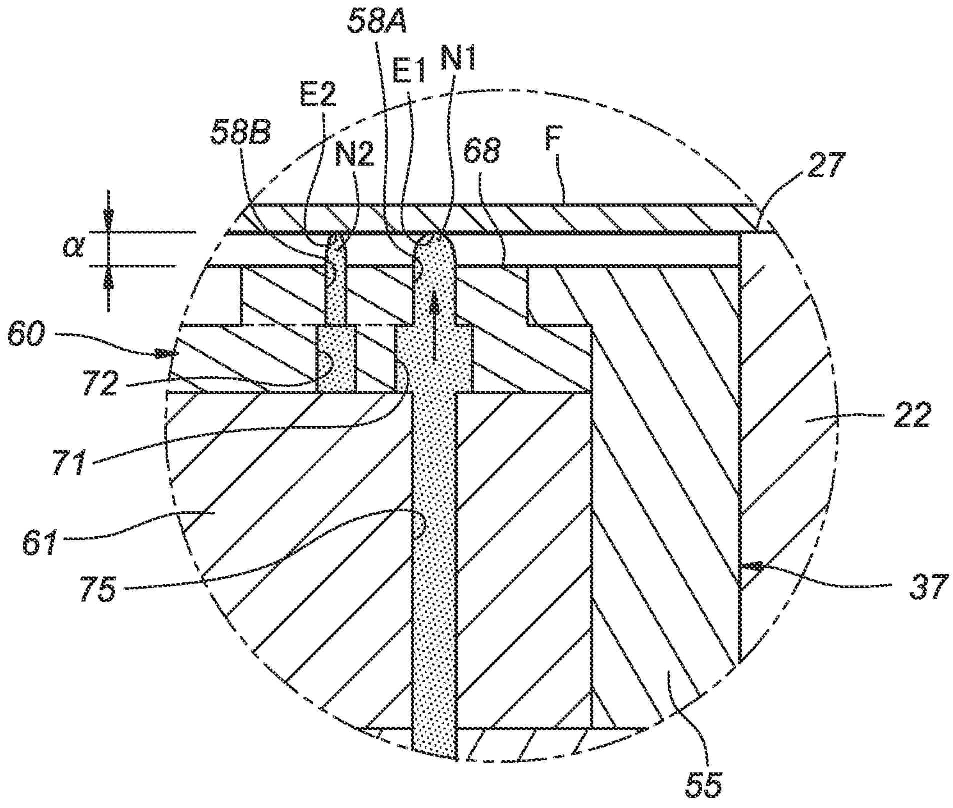
FIG. 8 is an enlarged view of a main part of the adhesive agent applying apparatus.

FIG. 5 is an explanatory diagram showing a detailed configuration of the adhesive agent applying apparatus 2 according to the first embodiment of the present invention. FIGS. 6 and 7 are perspective views showing an upper side (top side) and a lower side (bottom side) of a nozzle block 60 of the adhesive agent applying apparatus 2, respectively. FIG. 8 is an enlarged view of a main part of the adhesive agent applying apparatus 2.

As shown in FIG. 5, the application table 37 of the adhesive agent applying apparatus 2 includes an upper block 55 and a lower block 56 coupled to each other in the up-down direction. The upper block 55 is provided with a nozzle block 60 (adhesive agent discharge head) which is formed with multiple discharge ports 58A, 58B for respectively discharging the adhesive agent toward the application points E set on the strip F (see FIGS. 6 and 7 also). In the upper block 55, the nozzle block 60 is mounted on an upper surface of an inner block 61 positioned below it. The application table 37 is vertically movably inserted in a holding hole 62 formed in the lower holder 6 and the die plate 22.

The cam mechanism 39 includes a fixed cam 64 formed by a plate cam fixed to the bottom portion of the lower block 56 and a moving cam 66 formed by a plate cam movably provided on the bottom portion of the lower block 56. The moving cam 66 is connected to the driving apparatus 41 and is driven by the driving apparatus 41 to reciprocate in the left-right direction. The fixed cam 64 includes a sawtooth shape portion having sawtooth protrusions and sawtooth recesses arranged alternately in the left-right direction on the lower surface thereof. The moving cam 66 includes a sawtooth shape portion having sawtooth protrusions and sawtooth recesses arranged alternately on the upper surface thereof. Thus, when the sawtooth protrusions of the fixed cam 64 and the sawtooth protrusions of the moving cam 66 are in positions aligned in the left-right direction, the application table 37 is positioned in the raised position (transfer position) shown in FIG. 5.

As shown in FIG. 6, the nozzle block 60 consists of a plate having a substantially circular annular shape. The nozzle block 60 has multiple discharge ports 58A arranged at predetermined intervals in the circumferential direction on an outer peripheral side and multiple discharge ports 58B provided on an inner peripheral side.

More specifically, on the outer peripheral side of the nozzle block 60, sets of discharge ports (hole groups on the outer peripheral side), each set consisting of three discharge ports 58A lined along the radial direction, are arranged at predetermined intervals in the circumferential direction. Similarly, on the inner peripheral side of the nozzle block 60, sets of discharge ports (hole groups on the inner peripheral side), each set consisting of three discharge ports 58B lined along the radial direction, are arranged at predetermined intervals in the circumferential direction.

Here, three discharge ports 58A are disposed corresponding to each application point E1. In other words, three discharge ports 58A discharge the adhesive agent toward one application point E1, and expansion (merging) of the adhesive agent from these discharge ports forms one application region of the adhesive agent. Similarly, three discharge ports 58B are disposed corresponding to each application point E2. In other words, three discharge ports 58B discharge the adhesive agent toward one application point E2, and expansion (merging) of the adhesive agent from these discharge ports forms one application region of the adhesive agent. Note that the number and arrangement of the application points E on the strip F (the part corresponding to each iron core lamina W) and the number and arrangement of the discharge ports 58A, 58B corresponding to them can be changed in various ways as necessary.

As shown in FIG. 7, on the lower surface side of the nozzle block 60, adhesive agent accumulation portions 71, 72, each consisting of a groove having a circular annular shape, are formed. The adhesive agent accumulation portion 71 is disposed on an outer peripheral side of the nozzle block 60 so as to surround the adhesive agent accumulation portion 72. The adhesive agent accumulation portion 71 has the same depth as that of the adhesive agent accumulation portion 72 in the up-down direction. On the other hand, the adhesive agent accumulation portion 71 has a larger width than that of the adhesive agent accumulation portion 72 in the radial direction. Thus, the adhesive agent accumulation portion 71 can store a greater amount of adhesive agent than the adhesive agent accumulation portion 72. Note that the shape of the adhesive agent accumulation portions 71, 72 is not limited to the circular annular shape. For example, at least part of the adhesive agent accumulation portions 71, 72 may be formed radially or angularly.

Each discharge port 58A and each discharge port 58B penetrate the nozzle block 60 in the up-down direction. More specifically, each discharge port 58A communicates with the adhesive agent accumulation portion 71 and opens in the upper surface 68 of the nozzle block 60 (the upper block 55). Similarly, each discharge port 58B communicates with the adhesive agent accumulation portion 72 and opens in the upper surface 68 of the nozzle block 60 (the upper block 55).

In the lower block 56 and the inner block 61, an adhesive agent supplying passage 75 for supplying the adhesive agent to the adhesive agent accumulation portion 71 is formed. An upstream end of the adhesive agent supplying passage 75 is connected to a downstream end of a flexible adhesive agent supplying tube 79. An upstream end of the adhesive agent supplying tube 79 is connected to a first adhesive agent supplying apparatus 85. Similarly, in the lower block 56 and the inner block 61, an adhesive agent supplying passage 76 for supplying the adhesive agent to the adhesive agent accumulation portion 72 is formed. An upstream end of the adhesive agent supplying passage 76 is connected to a downstream end of a flexible adhesive agent supplying tube 80. An upstream end of the adhesive agent supplying tube 80 is connected to a second adhesive agent supplying apparatus 86.

The first adhesive agent supplying apparatus 85 has a first adhesive agent tank 88 annexed thereto. The first adhesive agent supplying apparatus 85 pressurizes the adhesive agent in the first adhesive agent tank 88 to a predetermined pressure, and continuously supplies the pressurized adhesive agent to the adhesive agent accumulation portion 71 via the adhesive agent supplying tube 79 and the adhesive agent supplying passage 75 at a predetermined flow rate (supply amount per unit time). The adhesive agent supplied to the adhesive agent accumulation portion 71 is discharged from each discharge port 58A. Note that the pressure and the flow rate of the adhesive agent supplied from the first adhesive agent supplying apparatus 85 to the adhesive agent accumulation portion 71 can be changed as appropriate.

Similarly, the second adhesive agent supplying apparatus 86 has a second adhesive agent tank 89 annexed thereto. The second adhesive agent supplying apparatus 86 pressurizes the adhesive agent in the second adhesive agent tank 89 to a predetermined pressure and continuously supplies the pressurized adhesive agent to the adhesive agent accumulation portion 72 via the adhesive agent supplying tube 80 and the adhesive agent supplying passage 76 at a predetermined flow rate. The adhesive agent supplied to the adhesive agent accumulation portion 72 is discharged from each discharge port 58B. Note that the pressure and the flow rate of the adhesive agent supplied from the second adhesive agent supplying apparatus 86 to the adhesive agent accumulation portion 72 can be changed as appropriate.

The adhesive agent applying apparatus 2 is provided with an adhesive agent application control device 90 that controls the discharge of the adhesive agent from each discharge port 58A, 58B in the nozzle block 60. The adhesive agent application control device 90 controls the discharge of the adhesive agent from the multiple discharge ports 58A, 58B so as to change the application amount of the adhesive agent to at least some of the multiple application points E depending on the type of each iron core lamina W. In the present embodiment, the adhesive agent application control device 90 can control the discharge of the adhesive agent from the discharge ports 58A, 58B by changing the flow rate (the supply amount per unit time) of the adhesive agent from the first and second adhesive agent supplying apparatuses 85, 86 to the nozzle block 60. Thereby, the adhesive agent applying apparatus 2 can change, with a simple configuration, the application amount of the adhesive agent depending on the type of each iron core lamina W to which the adhesive agent is to be applied.

The operation of the first and second adhesive agent supplying apparatuses 85, 86 is controlled based on the control signals sent out from the adhesive agent application control device 90. In the present embodiment, as the first and second adhesive agent supplying apparatuses 85, 86, adhesive agent transfer pumps having a known configuration are used. The adhesive agent application control device 90 can change the supply amount of the adhesive agent from each of the first and second adhesive agent supplying apparatuses 85, 86 to the nozzle block 60 by sending out control signals for changing the rotation speed of each of the adhesive agent transfer pumps, for example. Also, by changing the rotation speed of each of the adhesive agent transfer pumps, the discharge pressure of the adhesive agent (namely, the pressure of the adhesive agent supplied from each of the first and second adhesive agent supplying apparatuses 85, 86) can be changed.

The adhesive agent application control device 90 is provided with one or more processors, a display device (such as a liquid crystal monitor), an input device (such as a touch panel), a storage, a memory (RAM, ROM, etc.), a communication interface, and so on. According to a prescribed control program, the processor can totally control the adhesive agent application control process (see FIG. 9) performed by the adhesive agent applying apparatus 2. The adhesive agent application control device 90 is connected to the main control device 50 and the first and second adhesive agent supplying apparatuses 85, 86 in a communicable manner.

Note that in the present embodiment, the first adhesive agent supplying apparatus 85 is configured to continuously supply the adhesive agent to the adhesive agent accumulation portion 71 via the adhesive agent supplying tube 79 and the adhesive agent supplying passage 75, but it may supply the adhesive agent intermittently by changing the pressurization of the adhesive agent in the first adhesive agent tank 88 (same with the second adhesive agent supplying apparatus 86). Also, as the first and second adhesive agent supplying apparatuses 85, 86, instead of a transfer-type device as described above, a device having an adhesive agent discharge head that discharges the adhesive agent according to a known inkjet method may be adopted, for example. For instance, the first and second adhesive agent supplying apparatuses 85, 86 may have a configuration in which the adhesive agent is discharged according to an operation of a piezo element provided in the adhesive agent discharge head, so that the application amount of the adhesive agent to each application point can be changed.

Also, though in the present embodiment, two adhesive agent supplying apparatuses 85, 86 are provided, they may be provided as a single device that performs the same functions. This is the same with the first and second adhesive agent tanks 88, 89 annexed to them.

As shown in FIG. 8, in the adhesive agent applying apparatus 2, when the application table 37 is in the raised position, the upper surface 68 of the upper block 55 (the nozzle block 60) is positioned lower than the upper surface 27 of the die plate 22 by a level difference α. The adhesive agent in the adhesive agent accumulation portion 71 is discharged from each discharge port 58A to above the application table 37. Since the pressure of the adhesive agent in the adhesive agent accumulation portion 71 is maintained at a predetermined value and the adhesive agent has a predetermined viscosity, the adhesive agent discharged from each discharge port 58A to the outside forms a droplet part N1 that bulges above the upper surface 68 of the upper block 55 in a substantially hemispherical shape. The height of the droplet part N1 is slightly larger than that of the level difference α. Therefore, when the application table 37 is in the raised position and the strip F descends to a position in which the lower surface of the strip F comes into contact with the upper surface 27 of the die plate 22, the droplet part N1 of the adhesive agent at each discharge port 58A comes into contact with the lower surface of the strip F. As a result, the adhesive agent in each droplet parts N1 is transferred to the corresponding application point E1 in a dot. Similarly, the adhesive agent from the adhesive agent accumulation portion 72 forms droplet parts N2 on the upper surface 68 of the upper block 55, and the adhesive agent in each droplet parts N2 is transferred to the corresponding application points E2 in a dot.

The application amount (transfer amount) of the adhesive agent on each application point E1, E2 from the application table 37 is controlled by the level difference α and the size (volumes) of each droplet part N1, N2. The size of each droplet part N1, N2 can be adjusted by changing the flow rate of the adhesive agent in each adhesive agent accumulation portion 71, 72, the pressure of the adhesive agent, the viscosity of the adhesive agent, the inner diameter of each discharge port 58A, 58B, etc.

Figure 9:
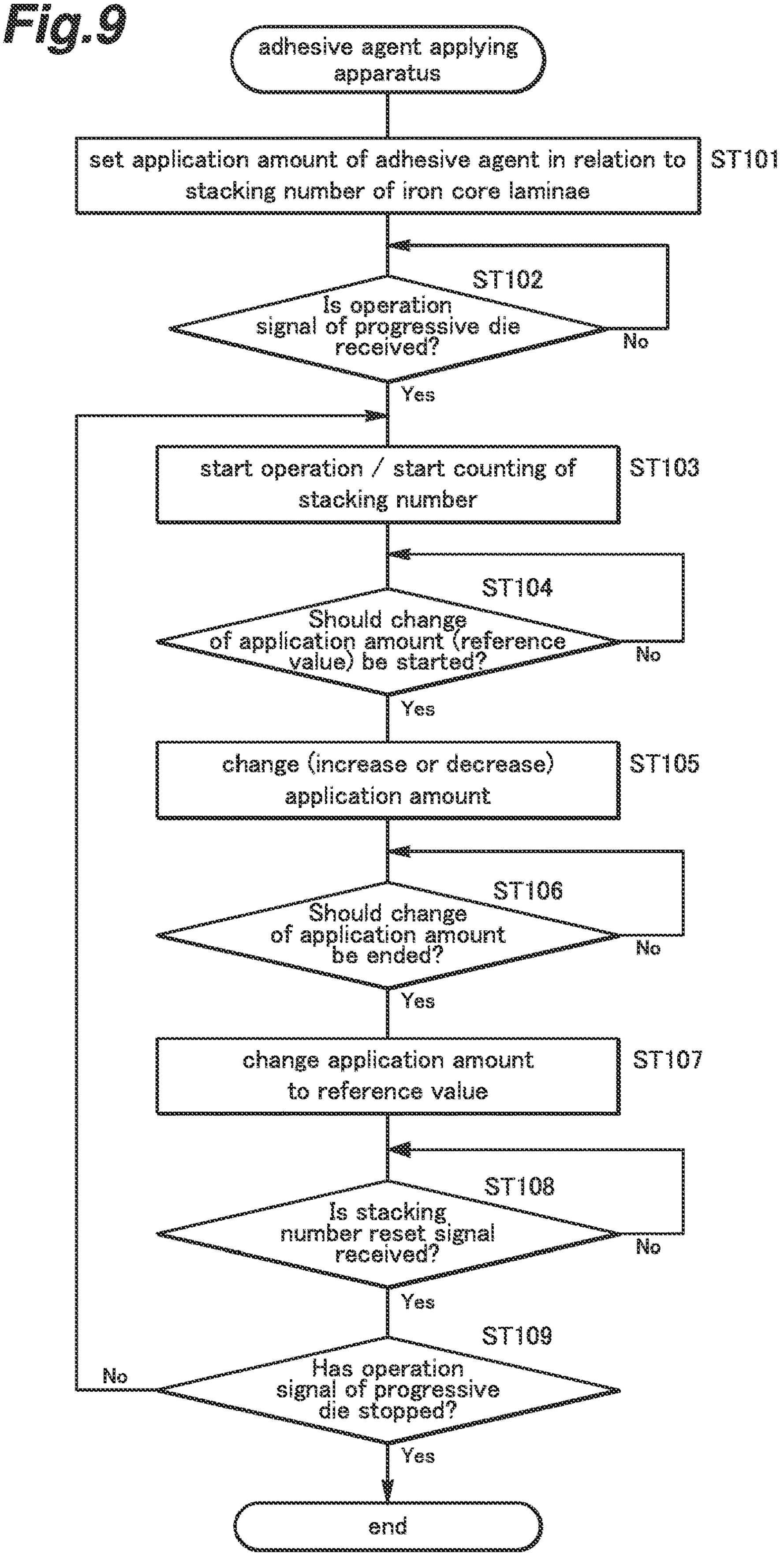
FIG. 9 is a flowchart showing a flow of adhesive agent application control process performed in the adhesive agent applying apparatus.
Figure 10:
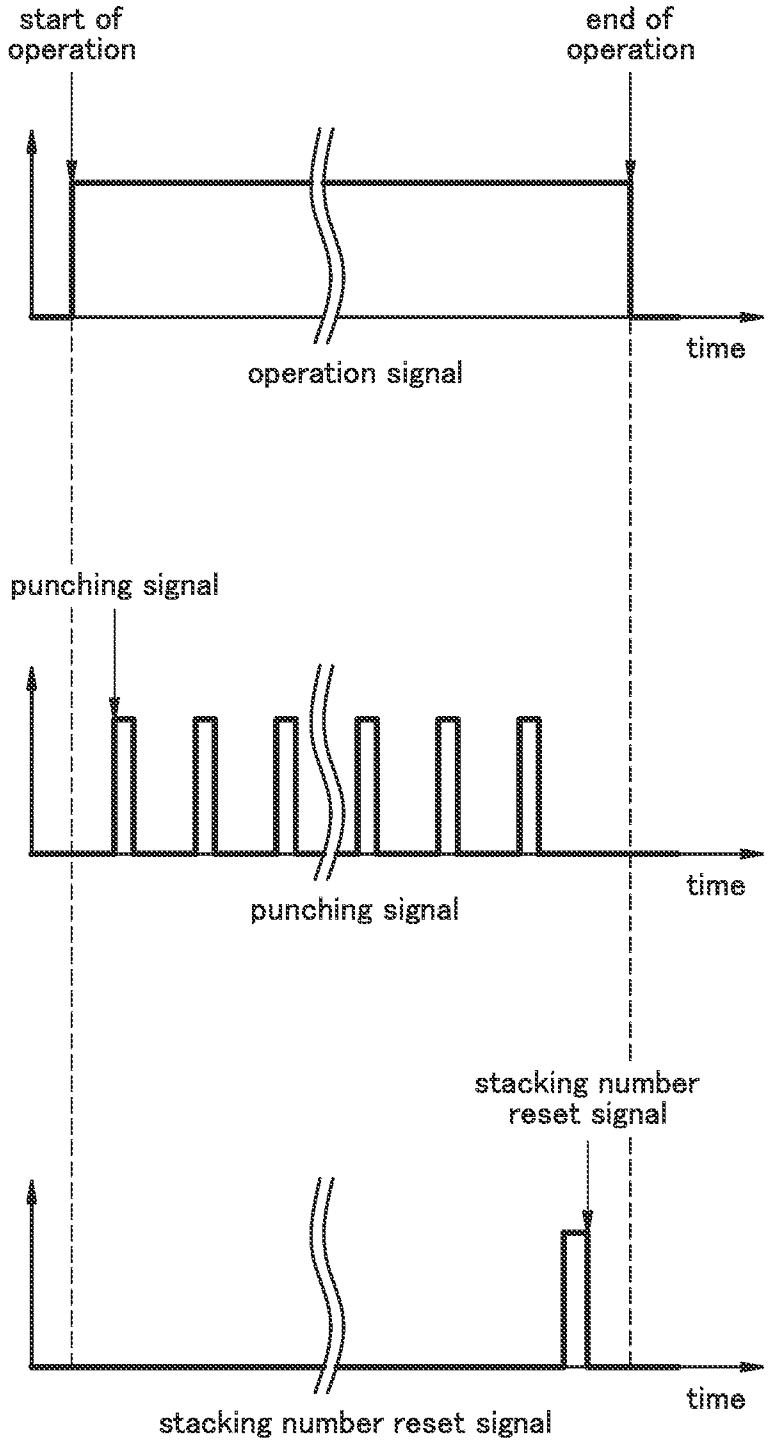
FIG. 10 is an explanatory diagram showing one example of signals used in the adhesive agent application control process performed in the adhesive agent applying apparatus.

FIG. 9 is a flowchart showing a flow of the adhesive agent application control process performed in the adhesive agent applying apparatus 2. FIG. 10 is an explanatory diagram showing one example of signals used in the adhesive agent application control process performed in the adhesive agent applying apparatus 2.

As shown in FIG. 9, in the adhesive agent application control process, first, the application amount of the adhesive agent is set in the adhesive agent application control device 90 in relation to the stacking number of the iron core laminae W (ST101). At this time, the adhesive agent applying apparatus 2 is waiting for operation.

Here, step ST101 is described by taking the application of the adhesive agent to the laminated iron core C shown in FIG. 2 as an example. Suppose, for example, that the laminated iron core C is composed, from the bottom, an N number of stacked iron core laminae W1 (the first iron core lamina block B1 on the lower side), an M number of stacked iron core laminae W2 (the second iron core lamina block B2), and an L number of stacked iron core laminae W1 (the first iron core lamina block B1 on the upper side). In the laminated iron core manufacturing apparatus 1, the multiple iron core laminae for constituting the laminated iron core C are punched in order from the iron core lamina W1 at the lowest layer, via an intermediate iron core lamina W2, to the iron core lamina W1 at the uppermost layer, and are stacked. In this case, in the step ST101, as the application amounts of the adhesive agent to the application points E1, E2 for the first to N-th iron core laminae W1 from the lower side (the first iron core lamina block B1 on the lower side), respective first application amounts (reference values) are set. Also, as the application amount of the adhesive agent to the application points E1 for the (N+1)th to (N+M)th iron core laminae W2 from the lower side (the second iron core lamina block B2), a second application amount, which is increased from the first application amount, is set. In this laminated iron core C, there is no change in the application amount of the adhesive agent to the application points E2 for the iron core laminae W2 (the first application amount) (see FIGS. 3 and 4). Further, as the application amount of the adhesive agent to the application points E1 for the (N+M+1)th to (N+M+L)th iron core laminae W1 from the lower side (the first iron core lamina block B1 on the lower side), the first application amount (the reference value) is set. Note that “the first application amounts” respectively set for the application points E1 and the application points E2 do not necessarily have to be the same.

In step ST101, to set such application amounts of the adhesive agent (the first application amounts and the second application amount), the rotation speeds of the adhesive agent transfer pumps respectively corresponding to the first and second application amounts are set in the adhesive agent application control device 90.

Next, at a predetermined timing after starting reception of the operation signal (see FIG. 10) of the progressive die (press machine) from the main control device 50 (Yes in ST102), the adhesive agent application control device 90 starts the operation (operation of applying the adhesive agent) of the adhesive agent applying apparatus 2 (ST103). The operation signal is sent out from the main control device 50 to the adhesive agent application control device 90 continuously from the operation start to the operation end of the progressive die. Also, in step ST103, the adhesive agent application control device 90 starts reception of punching signals (see FIG. 10) of the progressive die. Thereby, the adhesive agent application control device 90 counts the acquired punching signals of the progressive die with the counter function of the processor and treats the number of the punching signals as the current stacking number of the iron core laminae W for the laminated iron core C (namely, estimates the current stacking number from the number of the punching signals). The adhesive agent application control device 90 controls the discharge of the adhesive agent from the multiple discharge ports 58A, 58B based on the number of the acquired punching signals. Thereby, the adhesive agent applying apparatus 2 can reliably change the application amount of the adhesive agent depending on the type of each iron core lamina W. From the operation start to the operation end of the progressive die, the punching signals are generated at a predetermined period in synchronization with each punching operation of the iron core lamina W (each reciprocating movement of the upper die). These punching signals are sequentially sent out from the main control device 50 to the adhesive agent application control device 90.

Thereafter, the adhesive agent application control device 90 determines whether change of the application amount of the adhesive agent should be started (ST104) based on the current stacking number of the iron core laminae W (the number of the punching signals) and the application amounts of the adhesive agent set in step ST101 (here, the stacking number of the iron core laminae W at which the application amount should be changed). At this time, if the current stacking number matches the stacking number at which the application amount should be changed, the adhesive agent application control device 90 determines that the change of the application amount of the adhesive agent should be started (Yes in ST104), and transmits a control signal for changing (increasing or decreasing) the supply amount (namely, the application amount) of the adhesive agent to at least one of the first and second adhesive agent supplying apparatuses 85, 86 (ST105).

Here, step ST105 is described by taking the application of the adhesive agent to the laminated iron core C shown in FIG. 2 as an example, as in the description of step ST101. When the current stacking number of the iron core laminae W reaches the stacking number (N+1) at which the application amount should be increased, the adhesive agent application control device 90 sends out a control signal for increasing the supply amount of the adhesive agent to the first adhesive agent supplying apparatus 85. Upon receipt of this control signal, the first adhesive agent supplying apparatus 85 increases the supply amount of the adhesive agent (the rotation speed of the adhesive agent transfer pump) to a value corresponding to the application amount set in the step ST101.

Note that when the supply amount of the adhesive agent to the nozzle block 60 in the first adhesive agent supplying apparatus 85 is changed, some delay may occur before the application amount of the adhesive agent discharged from the nozzle block 60 changes (this also applies to the second adhesive agent supplying apparatus 86). Therefore, it may be preferable if the adhesive agent application control device 90 sends out the control signal for increasing the supply amount of the adhesive agent to the first adhesive agent supplying apparatus 85 when the current stacking number of the iron core laminae W reaches a stacking number (N+1-X) obtained by subtracting a predetermined number (namely, X, which corresponds to the time lag from when the supply amount of the adhesive agent to the application table 37 is increased to when the application amount of the adhesive agent is increased) from N+1 (namely, based on the punching signal corresponding to another iron core lamina punched out before the iron core lamina at which the type (shape) changes).

Subsequently, when it is determined, based on the current stacking number of the iron core laminae W and the application amounts of the adhesive agent set in step ST101, that the change of the application amount of the adhesive agent should be ended (ST106), the adhesive agent application control device 90 transmits a control signal for making the supply amount (namely, the application amount) of the adhesive agent return to the reference value to at least one of the first and second adhesive agent supplying apparatuses 85, 86 (ST107).

Here, step ST107 is described by taking the application of the adhesive agent to the laminated iron core C shown in FIG. 2 as an example, as in the description of steps ST101, ST105. When the current stacking number of the iron core laminae W reaches the stacking number (N+M+1) at which the change of the application amount should be ended, the adhesive agent application control device 90 sends out the control signal for making the supply amount of the adhesive agent return to the reference value to the first adhesive agent supplying apparatus 85. Upon receipt of this control signal, the first adhesive agent supplying apparatus 85 makes the supply amount of the adhesive agent (the rotation speed of the adhesive agent transfer pump) return to a value corresponding to the application amount set in step ST101 (the reference value).

In step ST107 also, by taking into account the time lag from when the supply amount of the adhesive agent to the nozzle block 60 is changed to when the application amount of the adhesive agent changes, the adhesive agent application control device 90 may preferably send out the control signal to the first adhesive agent supplying apparatus 85 when a stacking number obtained by subtracting a predetermined number from N+M+1 is reached.

Note that though an example in which the supply amount of the adhesive agent is returned to the reference value in step ST107 was shown, depending on the configuration of the laminated iron core C, the adhesive agent application control device 90 may send out the control signal for increasing the supply amount of the adhesive agent as in step ST105. As another way, in step ST107, the adhesive agent application control device 90 may send out a control signal for decreasing the supply amount of the adhesive agent to a value other than the reference value.

Also, in the description taking the application of the adhesive agent to the laminated iron core C shown in FIG. 2 as an example, the application amount to each application point E1 was changed, but the application amount to each application point E2 may be changed in a similar manner. In other words, the adhesive agent application control device 90 controls the discharge of the adhesive agent from the multiple discharge ports 58A, 58B so as to change the application amount of the adhesive agent to at least some of the multiple adhesive agent application points E1, E2.

Thereafter, upon receipt of a stacking number reset signal (see FIG. 10) of the progressive die (press machine) from the main control device 50 (Yes in ST108), the adhesive agent application control device 90 determines whether the operation signal of the progressive die has stopped (ST109). The stacking number reset signal is generated in synchronization with the punching operation (reciprocating movement of the upper die) for the iron core lamina W positioned in the lowest layer of a single laminated iron core, and is sent out from the main control device 50 to the adhesive agent application control device 90. When the operation signal of the progressive die has not stopped in step ST109 (No), the control returns to step ST103 again, and the process as described above is executed. Note that when the operation of the adhesive agent applying apparatus 2 has already been started in step ST103, counting of only the newly acquired punching signals is executed.

Finally, when the reception of the operation signal from the progressive die by the adhesive agent application control device 90 stops (Yes in ST109), the application control process ends.

Figure 11:
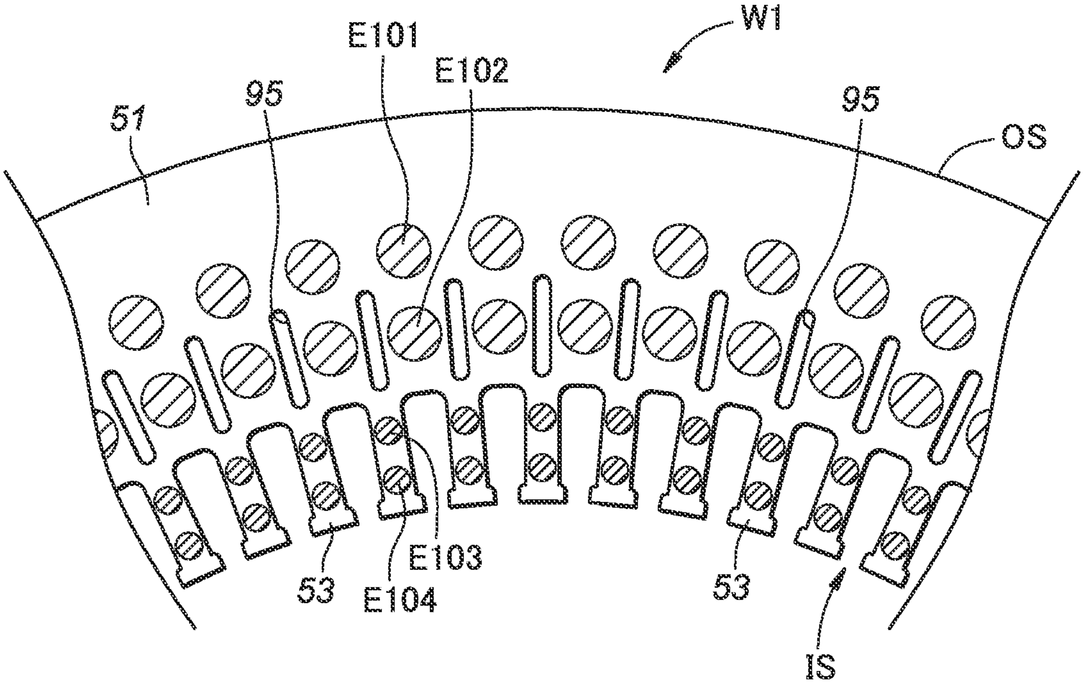
FIG. 11 is a plan view of a main part of the first iron core lamina according to a first modification of the laminated iron core.
Figure 12:
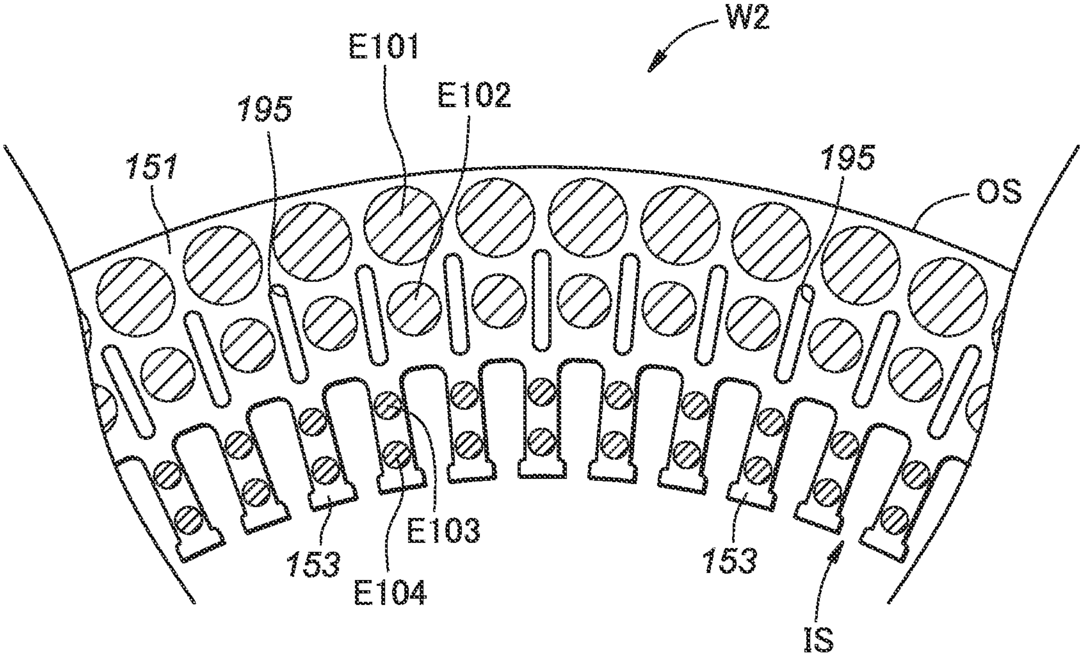
FIG. 12 is a plan view of a main part of the second iron core lamina according to the first modification of the laminated iron core.

FIGS. 11 and 12 are respectively plan views of main parts of the first and second iron core laminae according to a first modification of the laminated iron core C shown in FIG. 2. In FIGS. 11 and 12, the constituent parts same as those of the laminated iron core C shown in FIGS. 3 and 4 are denoted by the same reference numerals. Also, regarding the first modification, features not specifically mentioned below are the same as in the laminated iron core C shown in FIGS. 2 to 4, and thus, detailed description thereof will be omitted.

As shown in FIG. 11, in the first iron core lamina W1 according to the first modification, an opening 95 (an elongated hole extending in the radial direction) is formed on the radially outer side of each tooth portion 53.

On the adhesive agent applying surface (here, the lower surface) of the first iron core lamina W1, multiple application points E101 arranged substantially in a circle at predetermined intervals in the circumferential direction along the outer peripheral edge are set on the yoke portion 51. Also, application points E102 are respectively set in the spaces between the openings 95 adjoining in the circumferential direction. Further, two application points E103, E104 are set on each tooth portion 53. Here, the size of the application region (namely, the application amount) of each application point E101 is the same as that of the application region of each application point E102. Each application point E101 is disposed on the radially outer side of each application point E102. Also, the application region of each application point E103 is identical with the application region of each application point E104. Each application point E103 is disposed on the radially outer side of each application point E104. On the other hand, the application region of each application point E101, E102 is larger than the application region of each application point E103, E104.

As shown in FIG. 12, in the second iron core lamina W2 according to the first modification, an opening 195 (an elongated hole extending in the radial direction) is formed on the radially outer side of each tooth portion 153, as in the first iron core lamina W1 shown in FIG. 11. Also, the radial width of the yoke portion 151 is smaller than that of the yoke portion 51 of the first iron core lamina W1.

On the adhesive agent applying surface (here, the lower surface) of the second iron core lamina W2, multiple application points E101 arranged substantially in a circle at predetermined intervals in the circumferential direction along the outer peripheral edge are set on the yoke portion 151. Note, however, that the application region (namely, the application amount) of each application point E101 on the second iron core lamina W2 is set larger than that of each application point E101 on the first iron core lamina W1 (see FIG. 11) that is located in the same position as seen in the stacking direction. Also, the application points E102, E103, and E104 are set on the adhesive agent applying surface of the second iron core lamina W2 in the same manner as with the first iron core lamina W1 shown in FIG. 11.

Note that in the first modification described above, an example in which the openings 95, 195 are respectively provided in the first and second iron core laminae W1, W2 was shown, but instead of such openings 95, 195 (or together with the openings 95, 195), notches may be formed. In this case, the adhesive agent application control device 90 can control the application amount at the application points adjoining the notches in the same manner as with the application points E102 which adjoin the openings 95, 195 described above.

Figure 13:
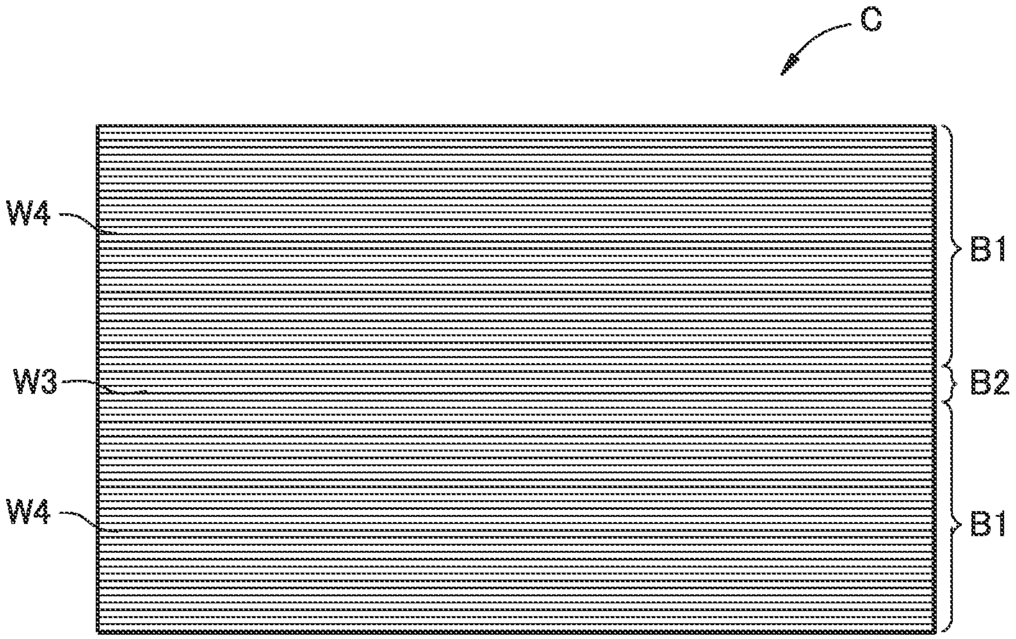
FIG. 13 is a side view of a second modification of the laminated iron core shown in FIG. 2.
Figure 14:
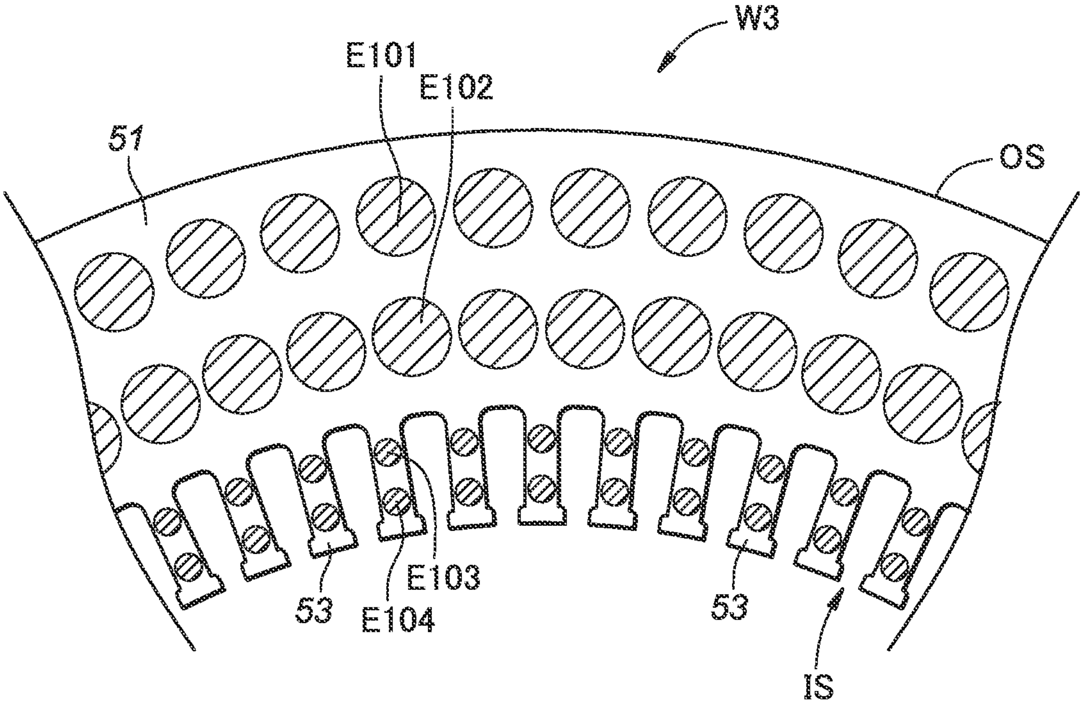
FIG. 14 is a plan view of a main part of a third iron core lamina according to the second modification of the laminated iron core.
Figure 15:
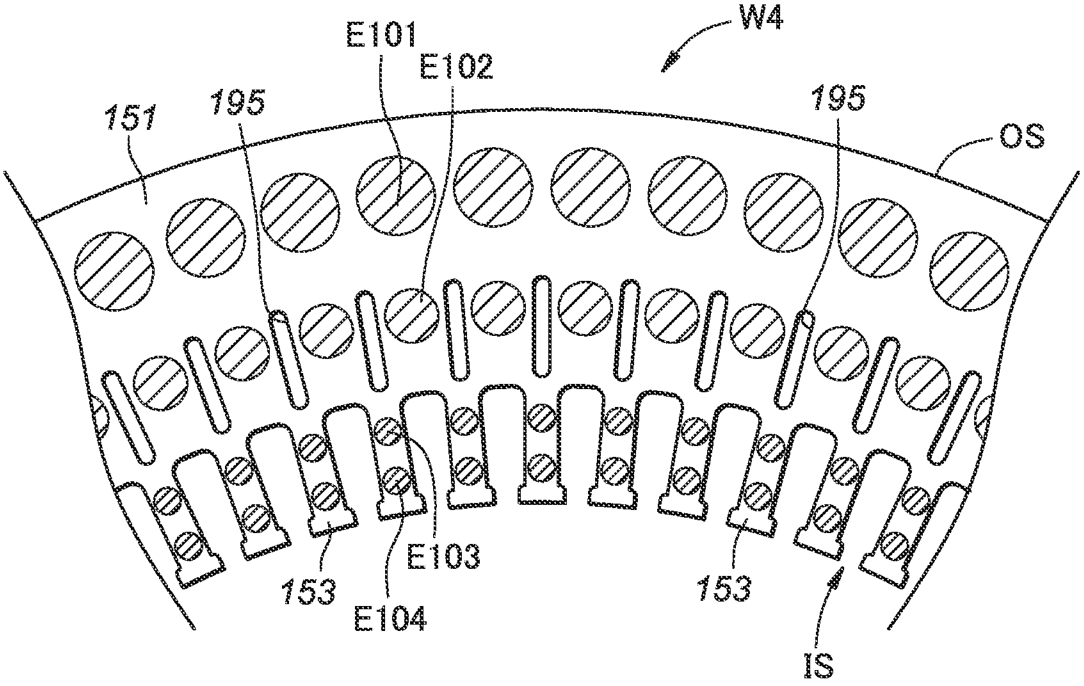
FIG. 15 is a plan view of a main part of a fourth iron core lamina according to the second modification of the laminated iron core.

FIG. 13 is a side view of a second modification of the laminated iron core C shown in FIG. 2. FIGS. 14 and 15 are respectively plan views of main parts of third and fourth iron core laminae W3, W4 according to the second modification of the laminated iron core C. In FIGS. 13 to 15, the constituent parts same as those of the laminated iron core C shown in FIGS. 2 to 4 or the first modification thereof (FIGS. 11 and 12) are denoted by the same reference numerals. Also, regarding the second modification, features not specifically mentioned below are the same as in the laminated iron core C shown in FIGS. 2 to 4 or in the first modification thereof (FIGS. 11 and 12), and thus, detailed description thereof will be omitted.

As shown in FIG. 13, the laminated iron core C according to the second modification is composed of third iron core laminae W3 and fourth iron core laminae W4 having the same outer diameter. Similarly to the laminated iron core C shown in FIG. 2, the laminated iron core C according to the second modification includes first iron core lamina blocks B1 each composed of only the fourth iron core laminae W4 and a second iron core lamina block B2 composed of only the third iron core laminae W3. The third iron core laminae W3 and the fourth iron core laminae W4 have the same outer diameter.

As shown in FIG. 14, on the adhesive agent applying surface (here, the lower surface) of the third iron core lamina W3 according to the second modification, multiple pairs of application points E101, E102, the two application points E101, E102 in each pair being lined in the radial direction, are set on the yoke portion 51 to be arranged substantially in a circle at predetermined intervals in the circumferential direction. Two application points E103, E104 lined in the radial direction are set on each tooth portion 53. The size of the application region (namely, the application amount) of each application point E101 is the same as that of the application region of each application point E102. Each application point E101 is disposed on the radially outer side of each application point E102. Also, the size of the application region of each application point E103 is the same as that of the application region of each application point E104. Each application point E103 is disposed on the radially outer side of each application point E103. On the other hand, the application region of each application point E101, E102 is larger than the application region of each application point E103, E104.

As shown in FIG. 15, in the fourth iron core lamina W4 according to the second modification, an opening 195 (an elongated hole extending in the radial direction), which is not formed in the third iron core lamina W3 (see FIG. 14), is formed on the radially outer side of each tooth portion 153, as with the first modification shown in FIG. 12. Also, the radial width of the yoke portion 151 is the same as that of the yoke portion 51 of the third iron core lamina W3.

On the adhesive agent applying surface (here, the lower surface) of the fourth iron core lamina W4, multiple application points E101 arranged substantially in a circle at predetermined intervals in the circumferential direction along the outer peripheral edge are set on the yoke portion 151. Also, application points E102 are respectively set in the spaces between the openings 195 adjoining in the circumferential direction. Further, two application points E103, E104 are set on each tooth portion 153. Here, the size of the application region (namely, the application amount) of each application point E101, E103, and E104 on the fourth iron core lamina W4 is set to be the same as that of each application point E101, E103, and E104 on the third iron core lamina W3 that is located in the same position as seen in the stacking direction. On the other hand, the application region of each application point E102 on the fourth iron core lamina W4 is set smaller than that of each application point E102 on the third iron core lamina W3 (see FIG. 14) that is located in the same position as seen in the stacking direction.

Figure 16:
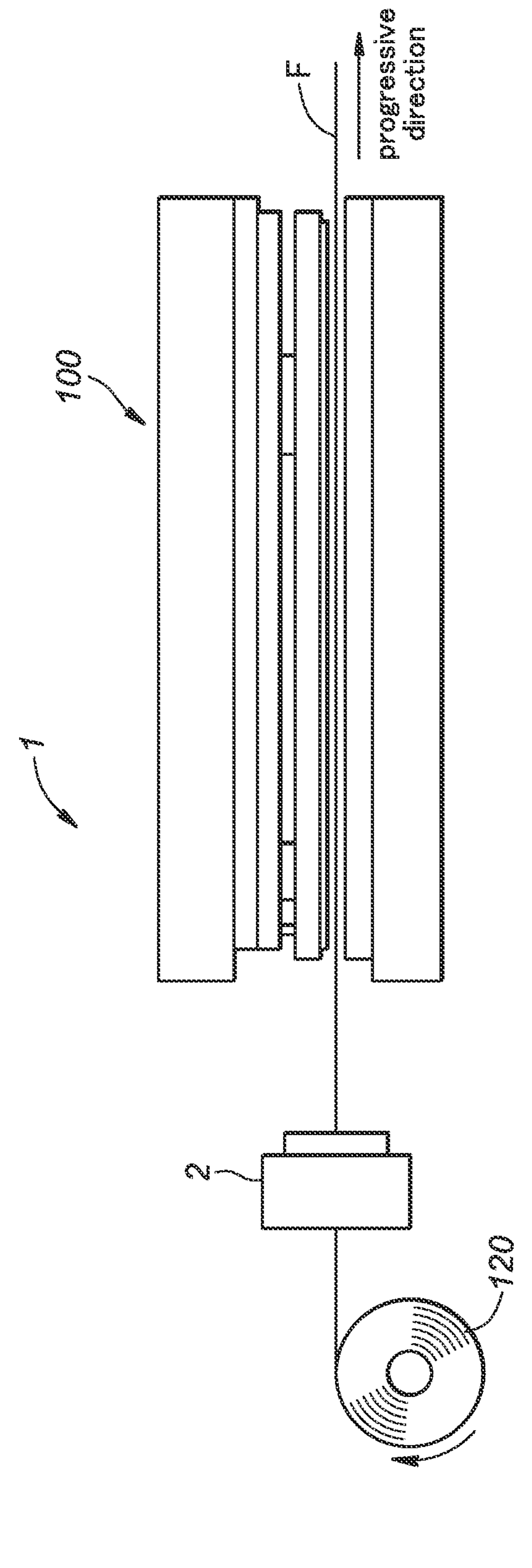
FIG. 16 is a schematic configuration diagram showing a manufacturing apparatus for a laminated iron core according to a second embodiment.

FIG. 16 is a schematic configuration diagram showing a laminated iron core manufacturing apparatus 1 according to a second embodiment. In FIG. 16, the constituent parts same as those of the laminated iron core manufacturing apparatus 1 shown in FIG. 1 are denoted by the same reference numerals. Also, regarding the second embodiment, features not specifically mentioned below are the same as in the above-described first embodiment, and thus, detailed description thereof will be omitted.

In the first embodiment described above, the adhesive agent applying apparatus 2 is integrally incorporated in the punching device (here, a progressive press die). In contrast, as shown in FIG. 16, in the laminated iron core manufacturing apparatus 1 according to the second embodiment, the adhesive agent applying apparatus 2 is provided as a separate body from a punching device 100.

The adhesive agent applying apparatus 2 is disposed on an upstream side of the punching device 100 with respect to the conveyance of the strip F. The strip F fed out from a coil 120 is introduced to the punching device 100 after the adhesive agent is applied thereto at the adhesive agent applying apparatus 2.

The adhesive agent applying apparatus 2 applies the adhesive agent to the multiple application points E set on the adhesive agent applying surface (here, the lower surface) of the strip F. Also, together with the application of the adhesive agent, the adhesive agent applying apparatus 2 may apply a known curing accelerator for promoting curing of the adhesive agent to the upper surface of the strip F.

In this case, as in the case of the above-described first embodiment, the adhesive agent applying apparatus 2 is not limited to a transfer-type device, and a device having an adhesive agent discharge head that discharges the adhesive agent according to a known inkjet method may be adopted, for example.

Also, as the punching device 100, a configuration obtained by removing the adhesive agent applying apparatus 2 from the laminated iron core manufacturing apparatus 1 according to the above-described first embodiment (see FIG. 1) may be adopted.

In the foregoing, the present invention has been described in terms of specific embodiments thereof, but these embodiments are for illustrative purposes only, and the present invention is not limited to these embodiments. For example, the adhesive agent applying apparatus and the adhesive agent application method for a laminated iron core as well as the manufacturing apparatus and the manufacturing method for a laminated iron core according to the present invention may be applied to a laminated iron core composed of iron core laminae having the same shape, without being limited to a laminated iron core composed of multiple types of iron core laminae having shapes different from each other. Note that not all of the constituent parts of the adhesive agent applying apparatus and the adhesive agent application method for a laminated iron core as well as the manufacturing apparatus and the manufacturing method for a laminated iron core according to the present invention shown in the above embodiments are necessarily indispensable, and they may be selectively adopted as appropriate within the scope of the present invention.

LIST OF REFERENCE NUMERALS

1: manufacturing apparatus for laminated iron core
2: adhesive agent applying apparatus
5: upper holder
6: lower holder
11: punch for pilot hole punching
12: punch for inner shape punching
13: punch for outer shape punching
17: stripper
22: die plate
24: die for pilot hole punching
25: die for inner shape punching
26: die for outer shape punching
29: squeeze ring
37: application table
39: cam mechanism
41: driving apparatus
43: upper die driving motor
44: crankshaft
45: outlet hole
47: encoder
50: main control device
51, 151: yoke portion
53, 153: tooth portion
55: upper block
56: lower block
58A: discharge port
58B: discharge port
60: nozzle block (adhesive agent discharge head)
61: inner block
62: holding hole
71: adhesive agent accumulation portion
72: adhesive agent accumulation portion
75: adhesive agent supplying passage
76: adhesive agent supplying passage
79: adhesive agent supplying tube
80: adhesive agent supplying tube
85: first adhesive agent supplying apparatus
86: second adhesive agent supplying apparatus
88: first adhesive agent tank
89: second adhesive agent tank
90: adhesive agent application control device
95, 195: opening
100: punching device
120: coil
C: laminated iron core
E: application point
F: strip
IS: inner shape
N1, N2: droplet part
OS: outer shape
W: iron core lamina

The invention claimed is:

1. An adhesive agent application method for a laminated iron core, wherein the laminated iron core comprises multiple types of iron core laminae having shapes different from each other and each punched out from a sheet steel strip, the method comprises an adhesive agent applying step in which an adhesive agent is discharged from multiple discharge ports respectively toward multiple adhesive agent application points set in a part of the sheet steel strip corresponding to each iron core lamina, the multiple adhesive agent application points are arranged in same positions on each iron core lamina as seen in a stacking direction of each iron core lamina regardless of the type of each iron core lamina, and in the adhesive agent applying step, discharge of the adhesive agent from the multiple discharge ports is controlled, without being interrupted, so as to change an application amount of the adhesive agent to at least some of the multiple adhesive agent application points depending on the type of each iron core lamina.

2. A manufacturing method for a laminated iron core, wherein the laminated iron core comprises multiple types of iron core laminae having shapes different from each other and each punched out from a sheet steel strip, the method comprising:

a punching step in which the multiple types of iron core laminae are sequentially punched out from the sheet steel strip which is intermittently conveyed; and an adhesive agent applying step in which an adhesive agent is discharged from multiple discharge ports respectively toward multiple adhesive agent application points set in a part of the sheet steel strip corresponding to each iron core lamina, wherein the multiple adhesive agent application points are arranged in same positions on each iron core lamina as seen in a stacking direction of each iron core lamina regardless of the type of each iron core lamina, and in the adhesive agent applying step, discharge of the adhesive agent from the multiple discharge ports is controlled, without being interrupted, so as to change an application amount of the adhesive agent to at least some of the multiple adhesive agent application points depending on the type of each iron core lamina.

3. The manufacturing method for the laminated iron core according to claim 2, further comprising a press working oil applying step in which press working oil is applied on one side or both sides of the sheet steel strip prior to the punching step, wherein the press working oil contains a curing accelerator of the adhesive agent.

* * * * *